United States Patent [19]

Sakurai et al.

[11] Patent Number: 5,689,718
[45] Date of Patent: Nov. 18, 1997

[54] SYSTEM AND METHOD FOR PROCESSING DOCUMENT INFORMATION USING PASSWORD PROTECTED ICONS THAT REPRESENT DOCUMENT CONTENT

[75] Inventors: Hiroshi Sakurai; Nobuyuki Ikeda; Akehiro Watabe, all of Tokyo, Japan

[73] Assignee: Mitsubishi Denki Kabushiki Kaisha, Tokyo, Japan

[21] Appl. No.: 594,373

[22] Filed: Jan. 30, 1996

Related U.S. Application Data

[63] Continuation of Ser. No. 154,164, Nov. 17, 1993, abandoned.

[30] Foreign Application Priority Data

Dec. 1, 1992 [JP] Japan ................................. 4-321782

[51] Int. Cl.$^6$ ................................................. G06F 7/00
[52] U.S. Cl. ........................ 395/779; 395/793; 395/348
[58] Field of Search ................................ 395/146, 155, 395/159, 160, 148, 144, 145, 147, 157, 161, 779, 793, 343; 364/419.1, 419.14, 419.17, 419.19

[56] References Cited

U.S. PATENT DOCUMENTS

| | | | |
|---|---|---|---|
| 5,202,828 | 4/1993 | Vertelney et al. | 395/159 |
| 5,365,360 | 11/1994 | Torres | 395/159 |

FOREIGN PATENT DOCUMENTS

| | | | |
|---|---|---|---|
| 4-111058 | 4/1992 | Japan . | |

OTHER PUBLICATIONS

Freelance Graphics Release 2.0 for Windows Installation Guide User's Guide, Lotus Development Corporation, 1991, 1992, pp. 1–18,19,21,23 (pp. 2–4;3–1 to 3–13; 9–1 to 9–5).

Baumgarten et al., Using Wordperfect 5.11 Que Corporation, 1989, pp. 855–856.

Macintosh User's Guide, Apple Computer, Inc., 1992, pp. 189–196.

"Macintoshes launched in 1991", PC User, Mar. 1992, n181, p. 141(12).

"Freelance Graphics: Lotus announces new version for Windows rel. 2.0", EDGE:Work–Group Computing Report, Nov. 13, 1992, v3 n130, p. 25(1).

*Primary Examiner*—Heather R. Herndon
*Assistant Examiner*—Stephen Hong
*Attorney, Agent, or Firm*—Wolf, Greenfield & Sacks, P.C.

[57] ABSTRACT

A documentary information processing system for creating and editing a multimedia document. Document files are correspondingly associated with icons symbolizing them. Likewise, partial areas provided within a document are correspondingly associated with icons symbolizing them. On a screen, information (texts, graphs, etc.) within a partial area is deleted and replaced by an icon. The icon is clicked for activation to return the information of the partial area symbolized by the icon onto the screen. There are two printing modes, that is a mode allowing the icon to be printed as it is, and a mode printing original information symbolized by an icon. It is possible to edit a document in editing units of icons. Interrelation can be defined among a plurality of icons.

14 Claims, 36 Drawing Sheets

| ICON | | |
|---|---|---|
| LAYOUT ATTRIBUTE | SECURITY ATTRIBUTE | MULTI-MEDIA ATTRIBUTE |
| POSITION ICON ○<br>AREA ICON □<br>OVERLAY ICON (INVERT) | NORMAL ICON<br>(NORMAL BRIGHTNESS)<br>SECRET ICON<br>(HALVED BRIGHTNESS) | CHARACTER ICON  A,B,....<br>TABLE ICON  ⊞<br>GRAPH ICON  ⩘<br>GRAPHICS ICON  •+<br>IMAGE ICON  I M<br>SOUND ICON  ⓧ<br>ANIMATION ICON  ☺<br>ANIMATED IMAGE ICON  ⚡<br>MIX ICON  MIX |

Fig. 5

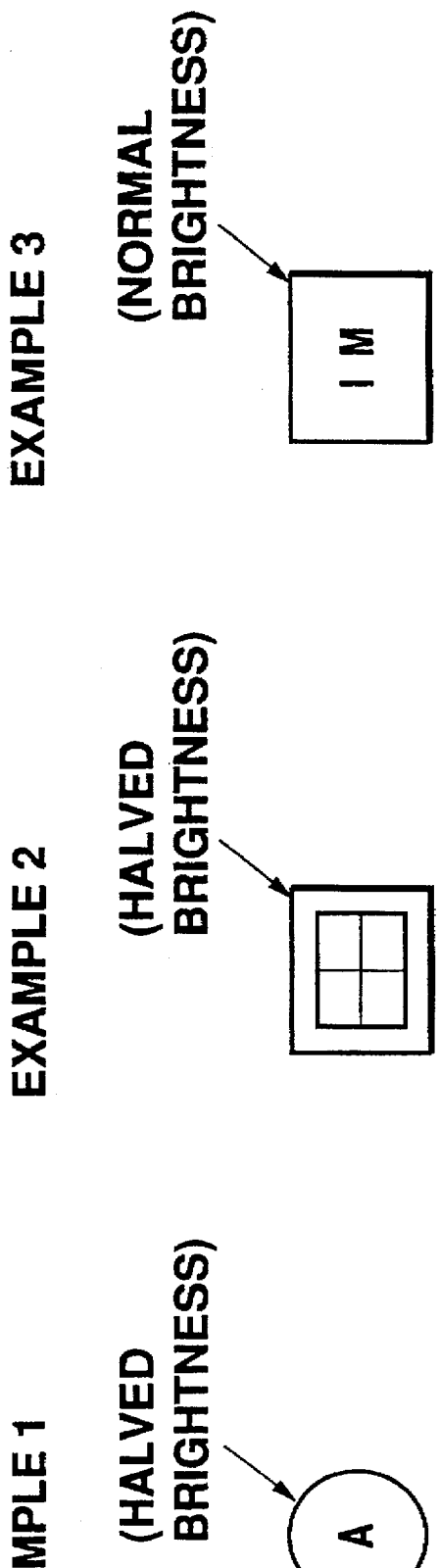

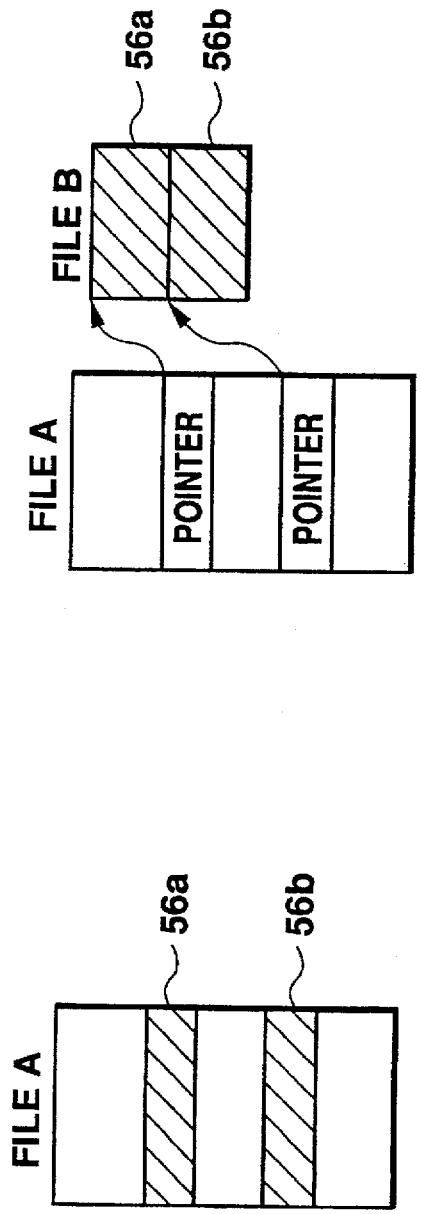
Fig. 16
Fig. 15
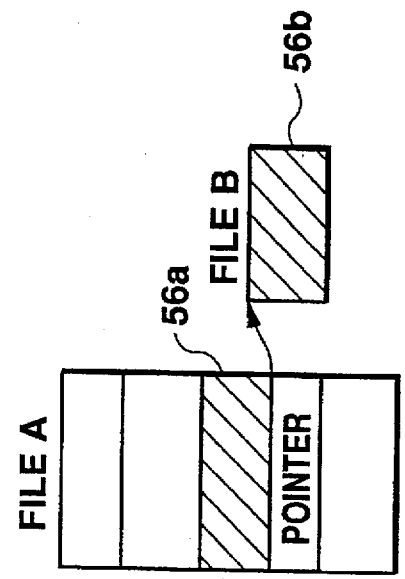
Fig. 18
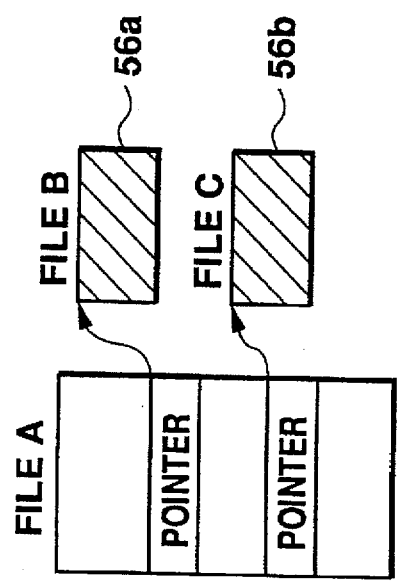
Fig. 17

```
                ACCOUNT
  MR.                          ABC COMPANY        SET PARTIAL
                                                  AREA
  PLEASE PAY FOLLOWING AMOUNT
  ┌─────────┬────────────┬──────────┐
  │  GOODS  │ QUANTITIES │  AMOUNT  │
  ├─────────┼────────────┼──────────┤
  │         │            │          │
  ├─────────┼────────────┼──────────┤
  │         │            │          │
  └─────────┴────────┬───┼──────────┤
                    TOTAL│          │
                         └──────────┘

COPY   MOVE   DELETE    ICON
```

Fig. 19

POSITION   AREA    OVERLAY

Fig. 20

(INVERTED DISPLAY)

53

| PERSONNEL EVALUATIONS ARE AS FOLLOWS. |
| ICHIRO SUZUKI B |
| TARO YAMADA A |
| JIRO KAWAI B |
| SABURO HATAYA C |
| HEREAFTER THESE PERSONNEL EVALUATIONS ARE USED TO ... |

FILE   RANGE   FORMAT   PRINT

RESULTS OF FOOTBALL GAMES ARE AS FOLLOWS.

| GIANTS | 10 WINS | 5 LOSSES |
|--------|---------|----------|
| COWBOYS | 9 WINS | 2 LOSSES |
| SKINS | 7 WINS | 7 LOSSES |

COPY    MOVE    DELETE    ICON

Fig. 28

POSITION    AREA

Fig. 29

CHARAC-TER    TABLE    GRAPH    GRAPHICS    IMAGE    SOUND    ANIMATION    ANIMATED IM    MIX

Fig. 30

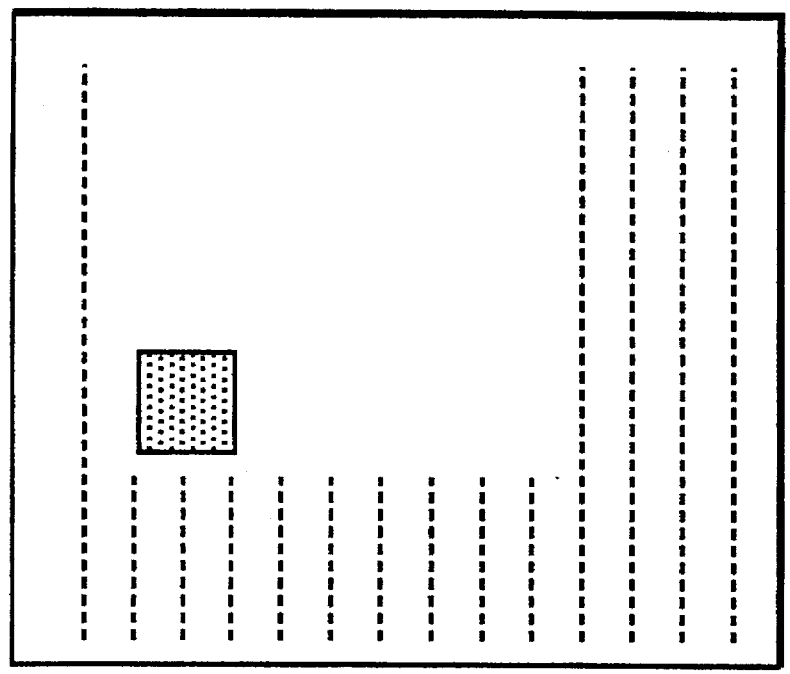
ICONIZATION
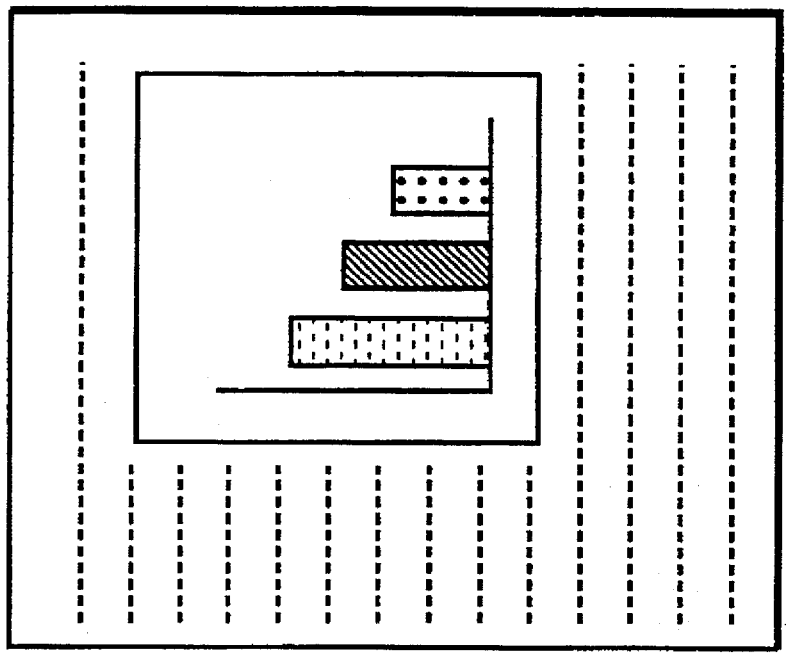
Fig. 56

| | |
|---|---|
| IDENTIFIER | 81 |
| AP FILE NAME | 82 |
| SOURCE DATA FILE NAME | 83 |
| PASS NAME OF AP NAME/ SOURCE DATA NAME | 84 |
| DATA SIZE FOR DISPLAY AND PRINT | 85 |
| X SIZE | 86 |
| Y SIZE | 87 |
| SOURCE DATA FORMAT | 88 |
| DISPLAY PROCESS CLASS | 89 |
| DISPLAY PROCESS ACTIVATION TIMING | 90 |
| ICON FILE NAME | 91 |
| APPLICATION NAME FOR PRINT | 92 |
| PRINT PROCESS ACTIVATION TIMING | 93 |
| PRINT PROCESS CLASS | 94 |
| AP AREA | 95 |
| PASSWORD | 96 |
| TERMINATION IDENTIFIER | 97 |

SYSTEM AND METHOD FOR PROCESSING DOCUMENT INFORMATION USING PASSWORD PROTECTED ICONS THAT REPRESENT DOCUMENT CONTENT

This application is a continuation of application Ser. No. 08/154,164, filed Nov. 17, 1993, now abandoned.

BACKGROUND OF THE INVENTION

1. Field of the Invention

The present invention relates to information processing techniques using icons applicable to document creation/editing systems such as word processors.

2. Description of the Related Arts

An icon is displayed on a display of a computer. A mouse is used to locate a cursor on the icon over the display. When the mouse is clicked in such a state, a file symbolized by the icon is opened to execute a function symbolized by the icon.

Examples of the icons will be hereinafter described. For example, a text editing program is symbolized by an icon in the form of a notebook on the display. Also, functions in one program are symbolized by the icons. For instance, an icon in the form of a pencil which will appear during the execution of a plotting program symbolizes a function to input characters or lines, while an icon in the form of an eraser symbolizes a function to erase pictures or graphics.

The manipulation by use of icons eliminates the necessity of directly inputting file names or commands to simplify the manipulation of the computer.

A computer is utilized to create and edit a document. The word processor is an exclusive system for that purpose. Use of the computer such as the word processor ensures an easy creation of a multi-media document. The multi-media document is a document including data of attributes such as image, graphics, and tables as well as texts consisting of characters and signs.

FIG. 68 depicts an example of the multi-media document 4 to be displayed on the display. The document 4 comprises a text area 5, an image area 6 and a graph area 7.

For the insertion of an image, the mouse is manipulated to set a "frame" having desired dimensions at a desired portion within the document. The frame serves to define the outline of an image area. Then, the image as data is inserted into the frame. Also in the case of inserting a graph, table or the like, the procedure is the same as the above. Further, the frame may be set to insert the text.

An area defined by the frame and constituting a part of the document will hereinafter be called "partial area".

Conventionally, an icon corresponds only to whole document, and does not to each partial area thereof.

In the conventional system disclosed in Japanese Patent Laid-Open Publication No. 11105/1992, a plurality of portions within one document can be displayed within respective windows, and the results of the editing carried out in one window may affect the data within other windows.

However, it has never been realized to link respective windows together by way of icons.

SUMMARY OF THE INVENTION

It is therefore an object of the present invention to enable icons to be set for each of partial areas in a document to thereby fully utilize the advantages of the icons to facilitate the creation and editing of documents.

Another object of the present invention is to allow the icons to be displayed on the document instead of data of the partial areas to thereby simplify the display of the document.

A further object of the present invention is to diversify the print of the document containing the icons in response to the demand of the operator.

A still further object of the present invention is to enable the relationship between two partial areas to be defined.

In order to accomplish the above objects, an information processing system using icons in accordance with the present invention comprises:
(a) means for storing the document;
(b) means for displaying the document on a screen;
(c) means for editing the document;
(d) means for setting a partial area within the document;
(e) means for correspondingly associating the partial area with an icon symbolizing the partial area; and
(f) display control means for erasing the information within the partial area on the screen to display the icon on the screen instead of the information.

According to the above configuration, when the operator sets a part of an area (or a partial area) of a document by the use of a mouse or the like, an icon can be correspondingly associated with the partial area. Then, the display control means controls the display screen to erase the information within the partial area on the screen and to display the icon instead of the information. In such a case, the information within the partial area remains stored within the storage means merely without being displayed.

According to the present invention, the icons can be defined with respect to not only the entire document as in the conventional manner, but also respective partial areas within the document. Since the information within the partial area is symbolized by the icon, the display screen is simplified. In addition, editing can be realized by use of the icons as will be described later.

According to one aspect of the present invention, the above-mentioned display control means has an area icon display mode and a position icon display mode.

More specifically, the display control means in the area icon display mode erases information within the partial area while maintaining the areal configuration of the partial area to display an area icon at any position within the partial area. On the contrary, the display control means in the position icon display mode erases the entirety of the partial area together with the information involved therein to display a position icon at a position where the partial area was present.

The display of the position icon enables the operator to easily understand the shape of the partial area, but necessitates a storage capacity sufficient to store the information on the shape of the partial area. The display of the position icon merely allows the operator to recognize that at that position there is present a partial area having a certain size and a certain shape with a view of the position icon. In other words, the operator is merely capable of understanding the presence or absence of the partial area and the position thereof. Nevertheless, the position icon eliminates the necessity of a storage capacity sufficient to store the information on the size and shape of the partial areas.

According to one aspect of the present invention, the system further comprises activation control means for allowing the information within the partial region to return for the display on the screen when the activation of the icon is specified. The term "activation" used herein means that the icon is erased from the screen to allow the information within the partial area corresponding to that icon to return onto the screen.

If a secret icon is set, the secret icon is activated only when a password specified for the secret icon coincides with an input password.

When printing a document prepared by the present invention, either a first print mode or a second print mode is selected. With the selection of the first print mode, the icon, if contained, is printed as it is at the time of printing the the document. With the selection of the second print mode, the original information symbolized by the icon is allowed to return for print instead of the icon at the time of printing the document. In the latter case, re-layout is carried out if the position icon is contained. The first print mode advantageously shortens the printing time although the original information is not printed. The second print mode is used in the case of, for example, printing a finished document.

The present invention ensures editing of the partial area by use of icons since the partial area is symbolized by the icon. For example, the move of the icon on the document causes a move of the information within the partial area symbolized by the icon, and likewise the deletion of the icon causes a deletion of the partial area symbolized by the icon. Hitherto, each time the partial area is subjected to the manipulation such as move, copy, or delete, the partial area had to be designated. According to the present invention, the manipulation with respect to the icon after correspondingly associating the icon with the information within the partial area will ensure a variety of information processing.

According to one aspect of the present invention, an interrelation is defined among a plurality of partial areas. In compliance with the interrelation, the change in the information within one partial area will be interlocked with the change in the information in the other partial area.

BRIEF DESCRIPTION OF THE DRAWINGS

FIG. 5 illustrates three attributes of the icons;

FIG. 6 is a diagram showing a first example of the icon;

FIG. 7 is a diagram showing a second example of the icon;

FIG. 8 is a diagram showing a third example of the icon;

FIG. 15 shows a second example of a relation between a document file and icon information;

FIG. 16 shows a third example of a relation between a document file and icon information;

FIG. 17 shows a fourth example of a relation between a document file and icon information;

FIG. 18 shows a fifth example of a relation between a document file and icon information;

FIG. 19 is a diagram showing the setting of a partial area;

FIG. 20 depicts the selection of an overlay icon on the menu;

FIG. 28 is a diagram showing the setting of a partial area;

FIG. 29 depicts the selection of the position icon on the menu;

FIG. 30 depicts the selection of a table icon on the menu;

FIG. 56 is a diagram for explaining the ionization of a partial area;

FIG. 59 is a diagram showing a concrete configuration of a header part;

DESCRIPTION OF THE PREFERRED EMBODIMENTS

Figure 1:
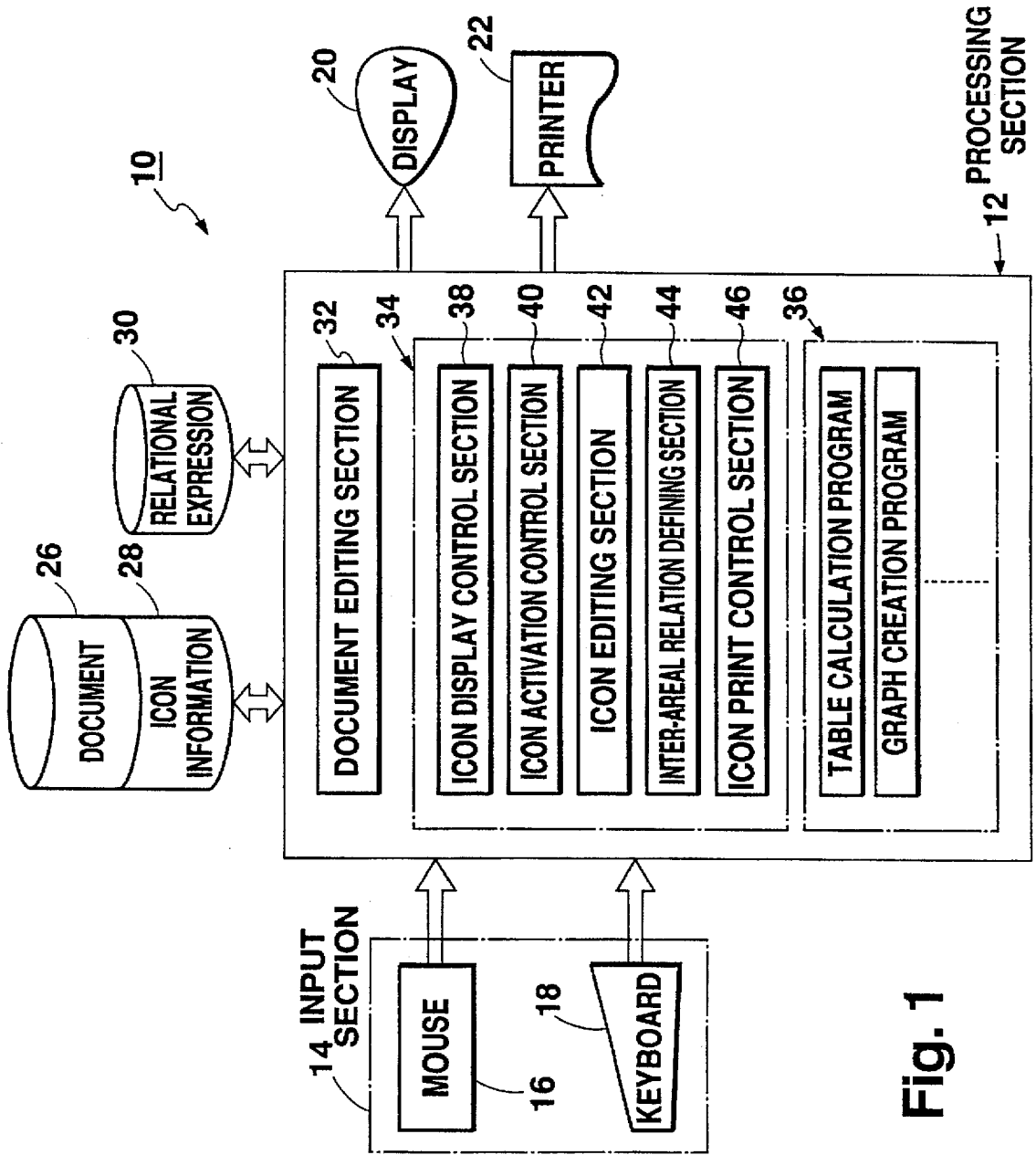
FIG. 1 is a block diagram showing the entire configuration of an information processing system using icons in accordance with the present invention.

Referring first to FIG. 1, there is shown an overall configuration of an information processing system in accordance with the present invention, which is, in this embodiment, a word processor generally designated at 10.

The system 10 of this embodiment has a feature to associate partial areas in a document with "partial area symbol icons" which correspondingly symbolize the areas. More specifically, the whole of a document file is correspondingly associated with an icon which symbolizes the file as in the conventional manner, whereas the partial areas are correspondingly associated with their respective partial area symbol icons (hereinafter, referred to simply as icons).

A processing section 12 essentially including a CPU and a plurality of programs is connected to an input section 14 consisting of a mouse 16 and a keyboard 18. The mouse 16 causing a cursor to move around on a display 20 is used to issue activation commands (double-clicked) to the icons. Also, the mouse 16 is used to set the partial area, and the like.

The processing section 12 is also connected to the display 20, a printer 22 and a loudspeaker not shown which constitute an output section. The processing section 12 is further connected to a document storage section 26 for storing document files, an icon information storage section 28 for storing icon information, and a relational expression storage section 30 for storing relational expressions which define interactions among the partial areas. It is to be noted that the document storage section 26 and the icon information storage section 28 are not required to be physically separately provided, and that the document files may hold icon information.

The processing section 12 is roughly grouped into three sections, that is, document editing 32, an icon management 34, and application execution 36.

The document editing section 32 has all the functions involved in the conventional word processor, and executes general processes for document creation and editing. That is, under its execution environment, the document editing section 32 enables the operator to create texts and edit thus created texts by use of the keyboard 18, etc.

The icon management section 34 for managing the display and activation of the icons correspondingly associated with the partial areas in a document comprises an icon display control section 38, an icon activation control section 40, an icon editing section 42, an inter-areal relationship defining section 44, and an icon print control section 46.

Figure 2:
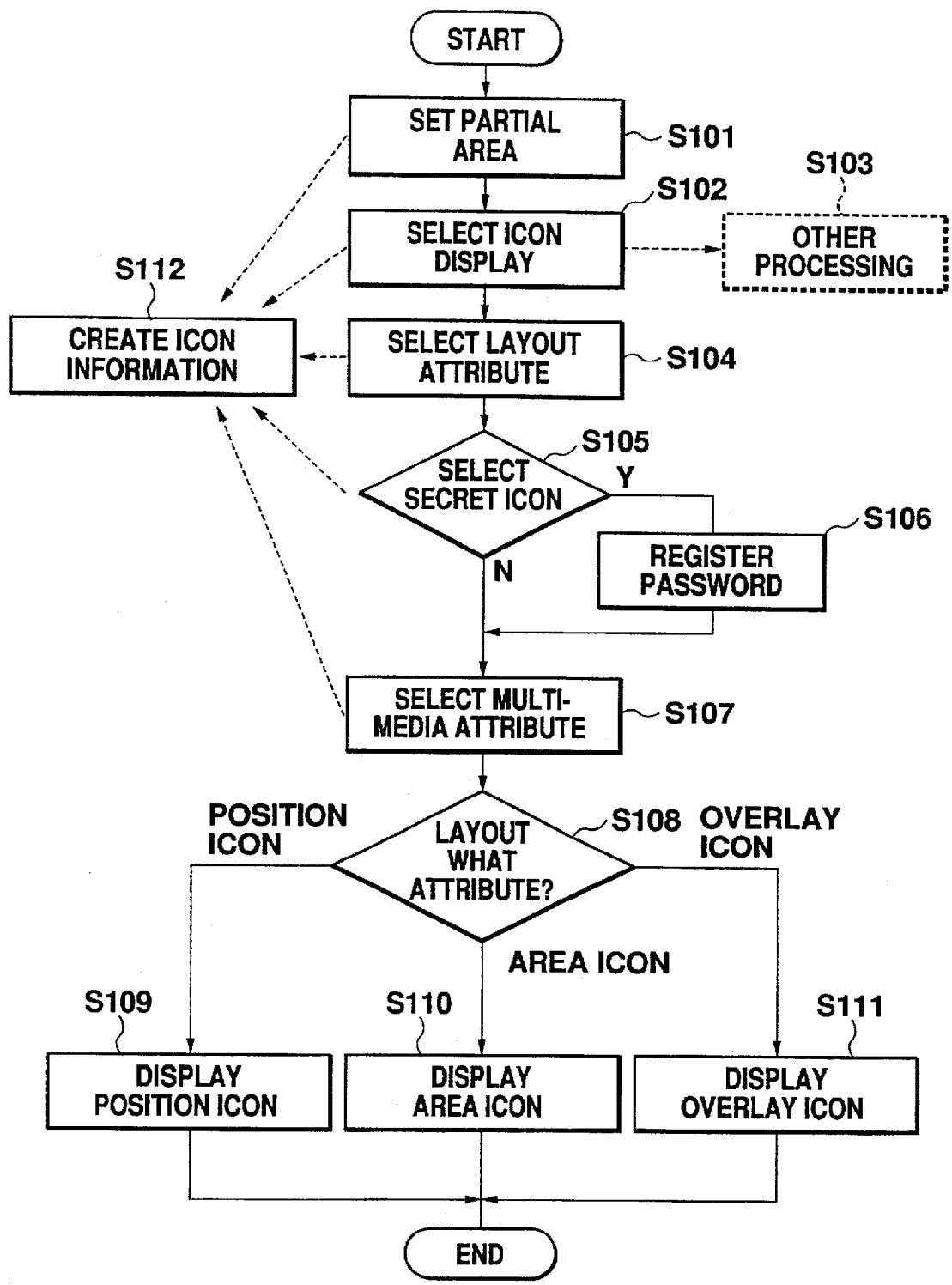
FIG. 2 is a flowchart showing an example of an icon display process.

The icon display control section 38 is intended to execute, for example, assignment of icons to the information in the respective partial areas, formation of icon patterns, and control of icon display onto the display 20. FIG. 2 illustrates the action of the control section 38.

Figure 3:
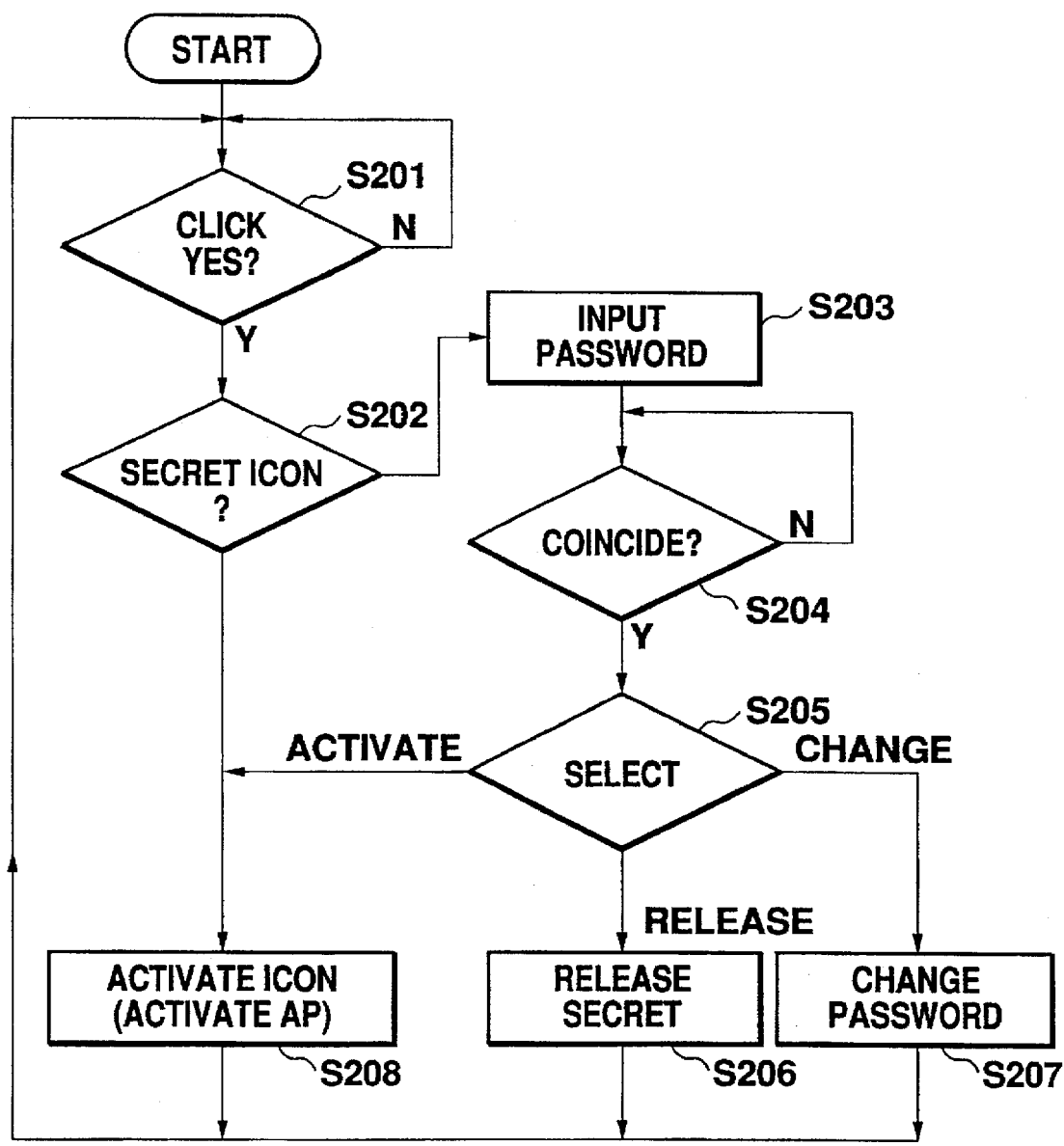
FIG. 3 is a flowchart showing an example of an icon activation process.

In FIG. 1, if one of the icons being displayed is subjected to a double-clicked activation command, then the icon activation control section 40 allows the information within the partial area symbolized by the icon to appear on the display screen. Otherwise, the icon activation control section 40 controls, for example, an automatic execution of application programs. FIG. 3 illustrates the action of the control section 40.

The icon editing section 42 in FIG. 1 carries out editing control in editing units of icons, and, for example, permits the information within the partial areas to automatically move merely by the movement of the corresponding icon.

The inter-areal relationship defining section 44 is intended for the definition of the interactions among the plurality of partial areas. The obtained definition is stored within the relational expression storage section 30 in the form of relational expressions.

Figure 4:
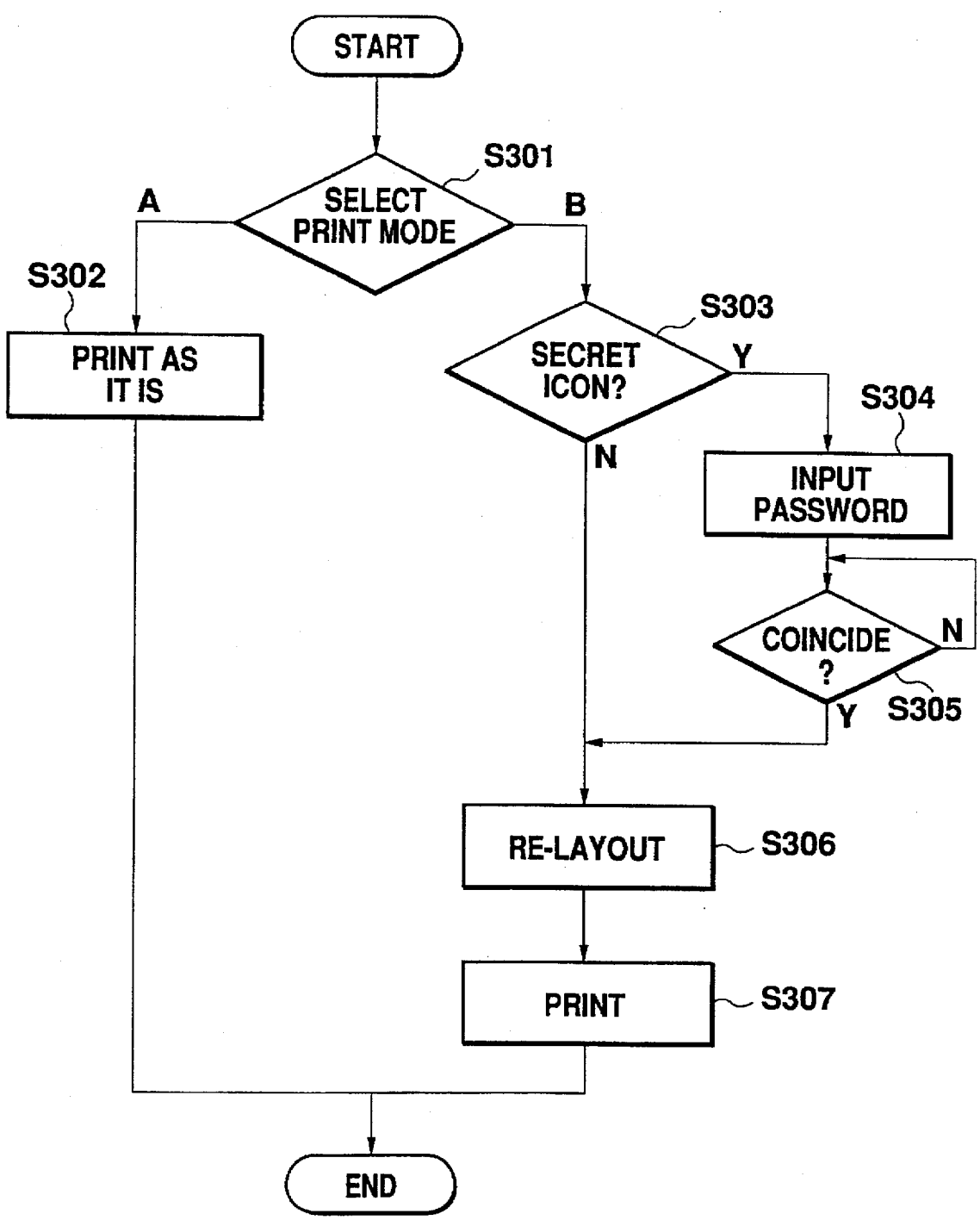
FIG. 4 is a flowchart showing an example of an icon print process.

The icon print control section 46 functions to control the print of documents including icons. FIG. 4 depicts the action of the control section 46.

In FIG. 1, the application execution section 36 comprises one or more application programs including, for example, a spreadsheet program, a graph creation program, a graphics creation program, an image processing program, and a sound processing program. These application programs may be located externally as well as inside the system.

Referring next to FIG. 5, description will be given of attributes of icons which symbolize corresponding partial areas.

The attributes of the icons are comprised of a layout attribute, a security attribute, and a multi-media attribute, as shown in FIG. 5. Each of the icons has these three attributes.

The layout attribute relating to the layout of a document at the time of icon display includes three types of icons, that is, a position icon, an area icon, and an overlay icon.

The position icon appears at the original position of a partial area after erasing the whole of the partial area together with the information involved therein. In other words, this icon indicates a position where a partial area is presently inserted into a document. When the position Icon is displayed, a change is made to the layout of the document, and the information on the size and configuration of the partial area does not appear on the display.

The area icon differs from the above-described position icon in that it appears at any position within a partial area after the exclusive erasure of the information involved in the partial area. When this icon is displayed, the layout of the document is maintained, in other words, the areal configuration of the partial area remain unchanged irrespective of the erasure of the information within the partial area.

The overlay icon represents that the information within the partial area symbolized by the icon can be overlaid on the other information for the display or print thereof.

These layout attributes can be represented by icon patterns or the like, and as shown in FIG. 5 by way of example, the position, area and overlay icons may be indicated as a circle, a square, or an inverted display, respectively, for the visual display of their attributes.

The security attribute is related to the security of the information within the partial areas symbolized by the icons. The security attribute includes a normal icon and a secret icon. The normal icon can be activated without requiring any specific manipulation, whereas the secret icon is allowed to be restrictively activated only when passwords coincide with each other. For instance, the normal icon and the secret icon are displayed at a normal brightness and a halved brightness, respectively.

The multi-media attribute is related to the classes of information within the partial areas symbolized by the icons, and includes nine types of icon. A character icon indicates that the information within the partial areas is constituted of characters such as letters and signs, which is represented by a character array pattern "A, B . . . ". A table icon indicates that the information within the partial areas is in the form of tables, which is represented by a pattern with a rough ruled line. A graph icon indicates that the information within the partial areas is in the form of graphs such as a circle graph or a line graph, which is represented by a pattern symbolizing the graph. A graphics icon indicates that the information within the partial areas is graphic information, which is represented by a graphics consisting of combined simple typical graphics. An image icon indicates that the information within the partial areas is image information such as photographs or facsimiles, which is represented by a sign "IM". A sound icon indicates that the information within the partial areas is sound information such as a human voice, animal's cry, or computer-synthesized sound, which is represented by graphics representing the human mouth. An animation icon indicates that the information within the partial areas is animation information, which is represented by a human-face pattern. An animated image icon indicates that the information within the partial areas is animated image information fetched through a television camera or the like, which is represented by a pattern imitating the television camera. A mix icon indicates that the information within the partial areas is combined information consisting of the above-mentioned plurality of pieces of information, which is represented by a pattern "MIX".

In this manner, the information symbolized by the icons is visually represented in the form of signs or pictures to enable the operator to easily recognize the attributes of the icons by merely viewing the icons.

FIGS. 6 through 8 illustrate examples of the icons. The icon shown in FIG. 6 includes the attributes of the position icon, the secret icon, and the character icon. The icon shown in FIG. 7 includes the attributes of the area icon, the secret icon, and the table icon. The icon shown in FIG. 8 includes the attributes of the area icon, the normal icon, and the image icon.

As discussed above, the icons each possess three attributes, that is, the layout attribute, the security attribute, and the multi-media attribute.

The patterns of the icons which are initially registered within the icon display control section 38 may be arbitrarily changed into desired patterns.

The change in the icon patterns is made as follows.

Although the icon patterns are registered in the system depending on their attributes as shown in FIG. 5, they may be changed by the operator if desired. The procedure comprises the steps of preparing a desirably configured icon by use of an icon pattern creating program not shown, storing it as one file in the system, selecting "pattern change" indicated by a broken line In FIG. 43 with an icon appearing on the screen, and inputting the file name storing the configuration of the icon. Thus, the original icon pattern can be replaced by an arbitrarily prepared icon pattern.

Referring next to FIGS. 9 through 13 in connection with FIG. 2, description will be given of the action of the icon display control section 38.

Figure 9:
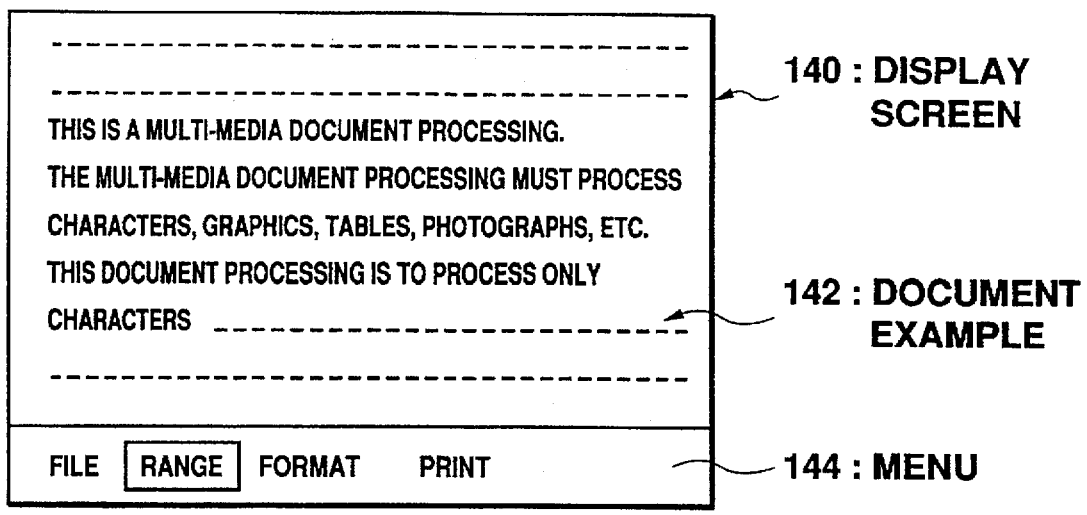
FIG. 9 depicts an example of a document displayed on a screen.
Figure 10:
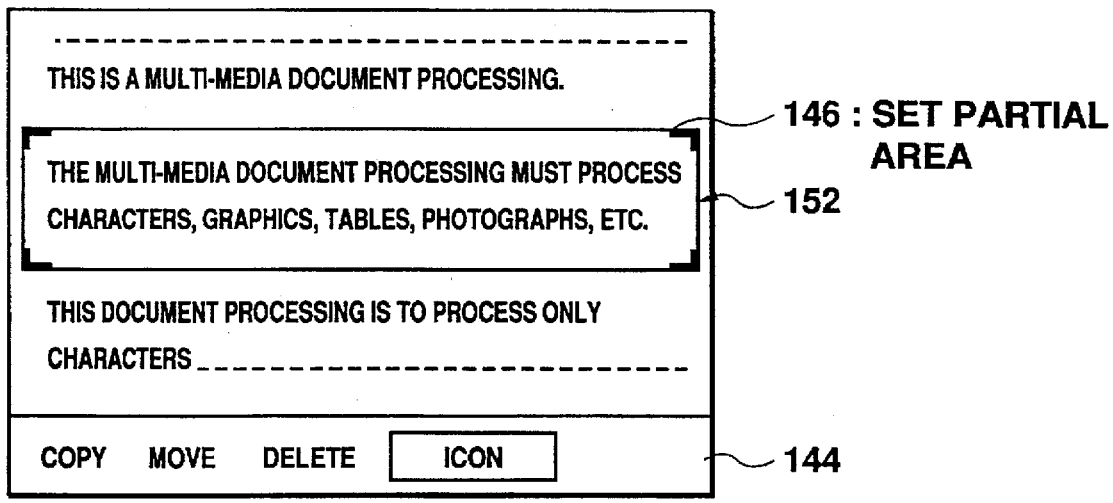
FIG. 10 depicts the setting of a partial region.

FIG. 9 illustrates, by way of example, a document 142 appearing on a screen 140 of the display 20. A menu 144 located at the bottom of the screen 140 indicates various functions which are selected through the manipulation of the cursor or the like. The menu display is not limited to the illustrated example, but may be located at the top of the screen, or alternatively a so-called pull-down menu may be employed.

In order to set a partial area for such a document 142, "range" is selected on the menu 144, and the range of a partial area 146 within the document 142 is designated by a frame 152 (S101 in FIG. 2). Then, the next menu 144 indicates words, "copy", "move", "delete", and "icon". If selecting the words other than "icon", a general editing process (S103) is executed.

Figure 11:
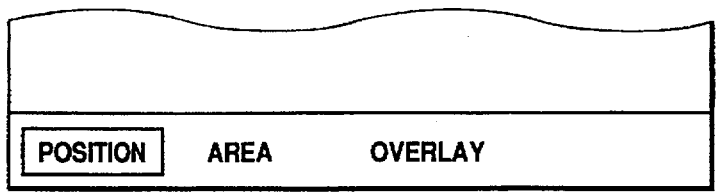
FIG. 11 depicts the selection of a position icon on a menu.

The "icon" in the menu 144 represents a process correspondingly associating the thus designated partial area with an icon. If selecting the "icon" (S102), then the next menu indicates "position", "area" and "overlay" as shown in FIG. 11. In this case, the "position", "area" and "overlay" allow the selection of the position icon, area icon and overlay icon, respectively. For instance, the "position" is selected (S104).

Herein, description will not be given of the setting of the secret icon (S105, S106) and of the selection of the multi-media attributes (S107) in FIG. 2.

A series of processes from S101 to S105 in FIG. 2 enables the icon display control section 38 to create the icon information (S112).

Figure 12:
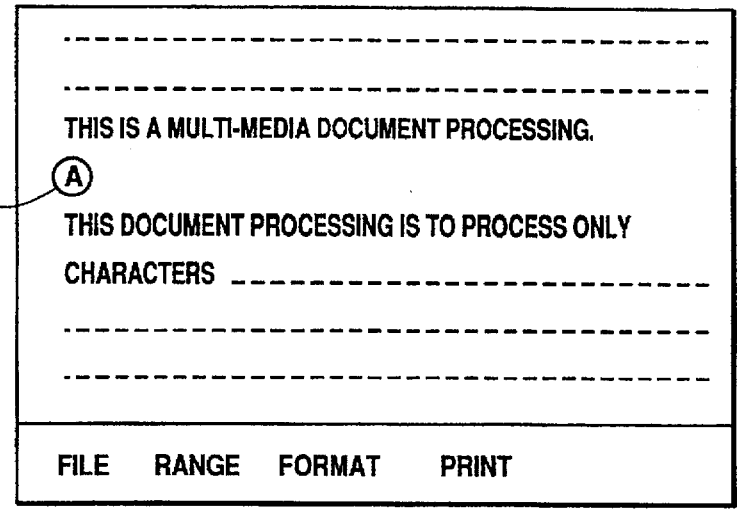
FIG. 12 depicts a position icon appearing in a document.

If the "position" is selected at S104 in FIG. 2, the process will be diverged at S108 for the execution of S109. More specifically, the whole of the partial area 146 designated in FIG. 10 disappears on the screen together with the information involved therein as shown in FIG. 12, but instead a position icon 148 appears at the position where the partial area was originally present (S109). That is, when the position icon 148 is displayed, the areal configuration of the partial area disappears to permit the text behind the partial area to move toward the text in front thereof, which results in a change in the layout. In the FIG. 12 example, the partial area of a plurality of lines is erased, and the position icon appears on the left end of the first line of the original partial area.

Figure 13:
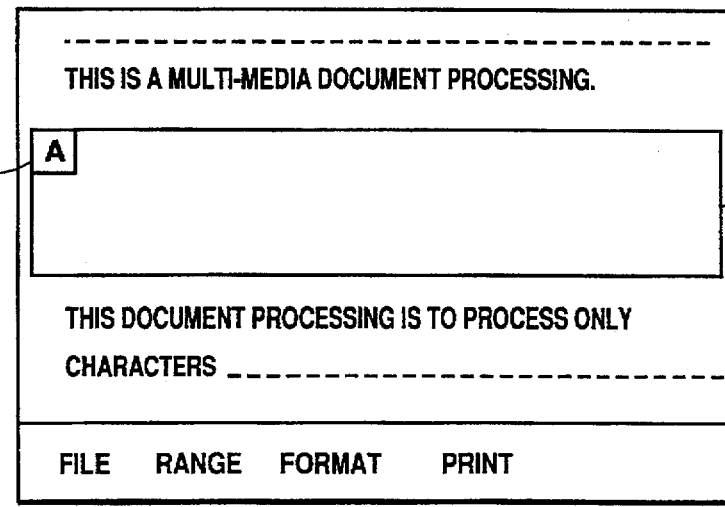
FIG. 13 depicts an area icon appearing in a document.

On the contrary, if "area" is selected in FIG. 11 (S104), the information (for example, a text) within the partial area 146 is erased, but the area of the partial area 146 remains unchanged, allowing an area icon 50 to be displayed on the top left of the area (S110) as shown in FIG. 13 where reference numeral 52 denotes a frame defining the partial region.

Figures 21, 22:
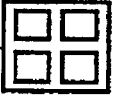
FIG. 21 depicts the overlay icon appearing on the screen.
FIG. 22 depicts an example of a document containing data which are desired to be kept secret.

On the other hand, the display of the overlay icon is carried out as follows. As shown in FIG. 19, the entire format of a bill issued by the ABC company is designated as the range of the partial area (S101). Afterwards, the "icon" is selected from the menu (S102), and then the "overlay" is selected from the menu (S104) as shown in FIG. 20. At that time, as shown in FIG. 21, the format of the bill shown in FIG. 19 is erased and succeeded by the overlay icon 58 appearing in a black-white inverted pattern on the left top of the screen (S111).

Afterwards, into the space of the partial area where the format of the bill was originally present, there are input the name of the company which is an addressee of the bill, goods, quantities, and amounts of money.

In order to print this document, the input data for the bill (refer to FIG. 21) is overlaid on the format of the bill (refer to FIG. 19). It is natural that the double-clicked activation of the overlay icon 53 ensure an overlaid display of two such pieces of information.

Figure 14:
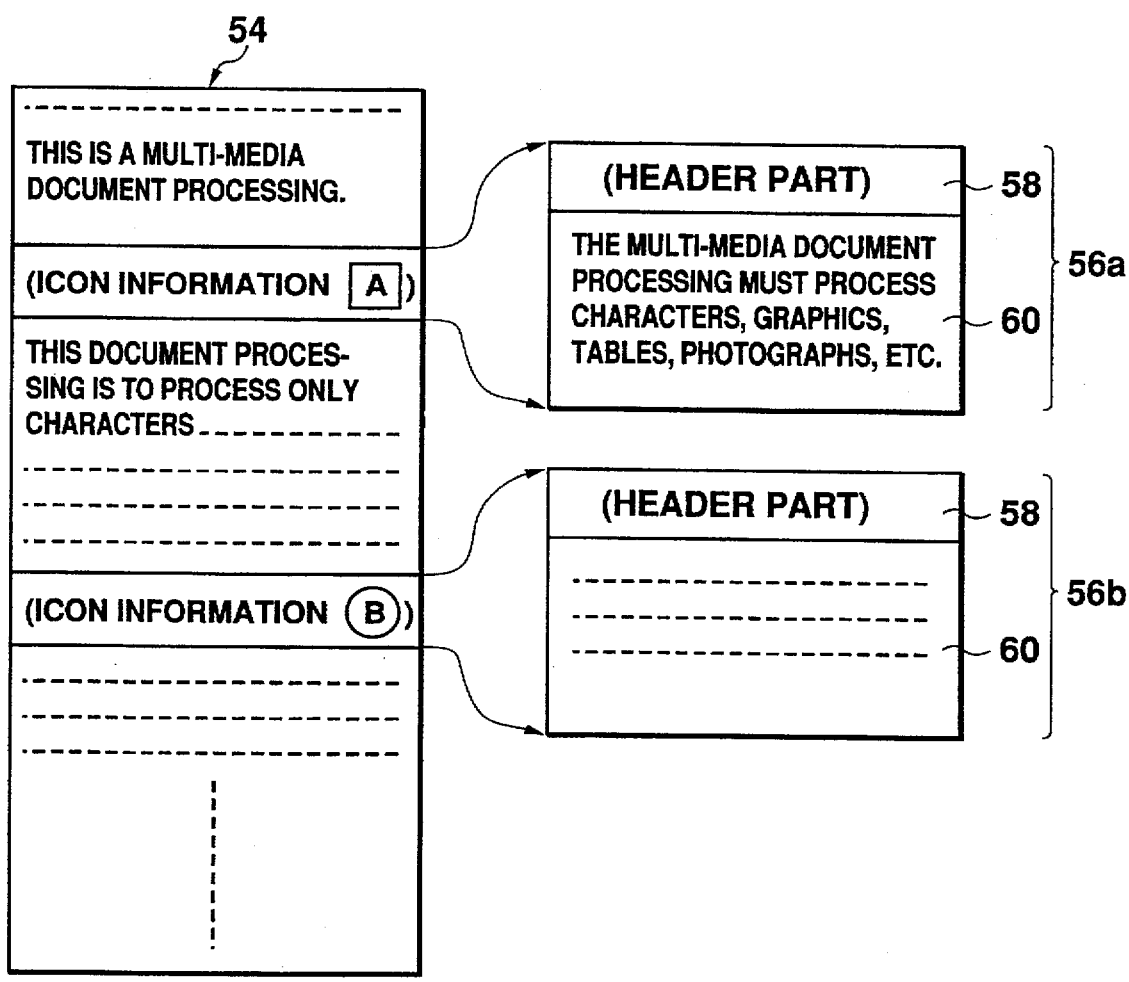
FIG. 14 shows a first example of a relation between a document file and icon information.

FIG. 14 illustrates, by way of example, a file organization of a document. Icon information 56a and 56b shown in FIG. 14 are to be prepared by the icon display control section 36. The icon information 56a and 56b each comprise a header part 58 and a data part 60. The header part 58 includes management information associated with the icon as shown in FIG. 59 later, while the data part 60 includes the information within the partial area symbolized by the icon and read out at the time of screen display and printing. This icon information is stored within the icon information storage section 28 shown in FIG. 1.

FIG. 15 through 18 depict other examples of management of the icon information 56. In FIG. 15, the icon information 56a, 56b is inserted into the document file A in the same manner as the FIG. 14 example. This means that the document information and the icon information are managed in one file. In FIG. 16 example, the document information and the icon information 56a, 56b are separately managed in their respective files. A pointer by which the file B of the icon information 56a, 56b are specified is inserted into the document file A. Although the plurality of pieces of icon information 56a and 56b are stored within one file B in the example shown in FIG. 16, the icon information 56a and 56b are separately stored within their respective files B and C in the example shown in FIG. 17. In the example shown in FIG. 18, on one hand the icon information 56a is stored within the document file A, whereas on the other hand the icon information 56b is stored within the separately provided file B.

Any storage form of the icon information 56 may be employed as long as the relationship between the document and the partial area is specified.

The secret icon will now be described with reference to FIG. 22 through 26.

The data shown in FIG. 22 are personal evaluation data whose disclosure must be restricted to specified persons. To this end, the secret icon is utilized.

Figure 23:
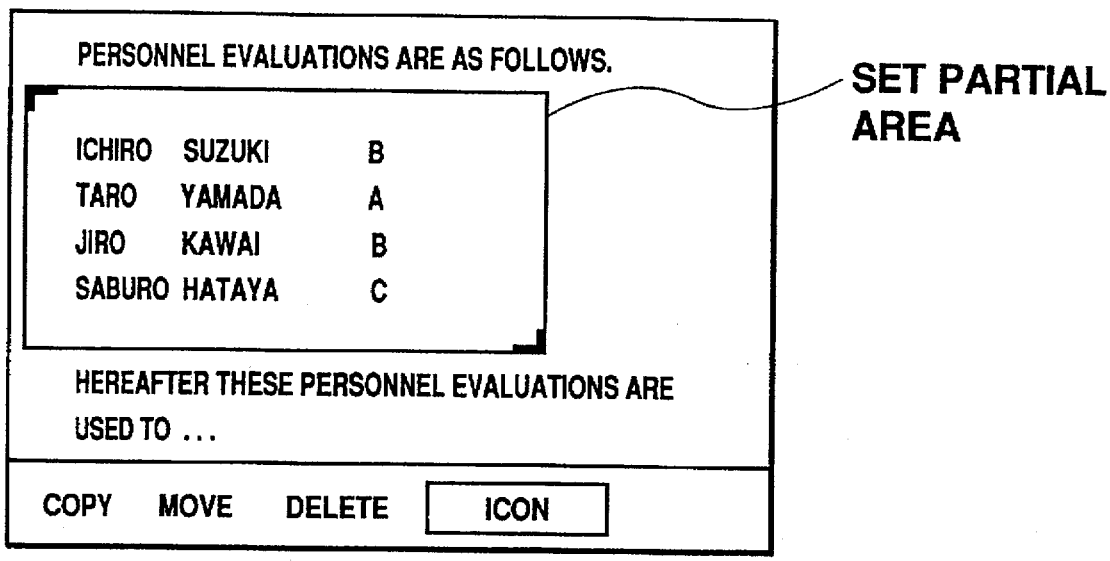
FIG. 23 is a diagram showing the setting of a partial area.
Figure 24:
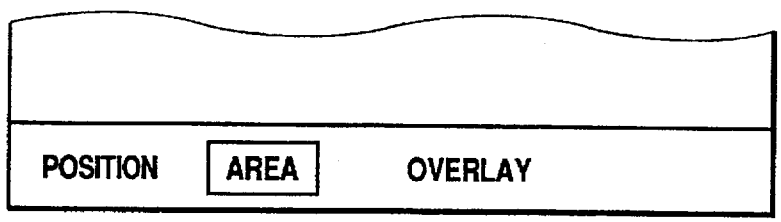
FIG. 24 is a diagram showing the selection of the area icon on the menu.
Figure 25:
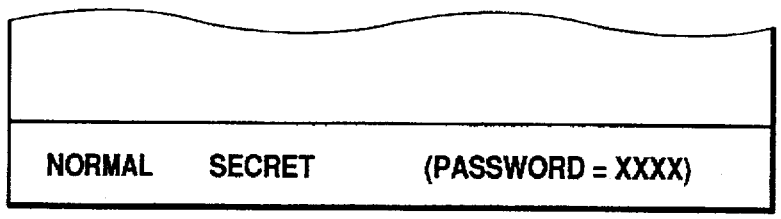
FIG. 25 shows both the selection of a secret icon and the input of a password on the menu.

In FIG. 22, the "range" is selected from the menu (S101), and then the partial area is set by use of a frame as shown in FIG. 23 (S102). In other words, the range (which is required to be kept secret) is framed. Then, the "area" is selected on the menu as shown in FIG. 24 for the selection of the area icon (S104).

Figure 26:
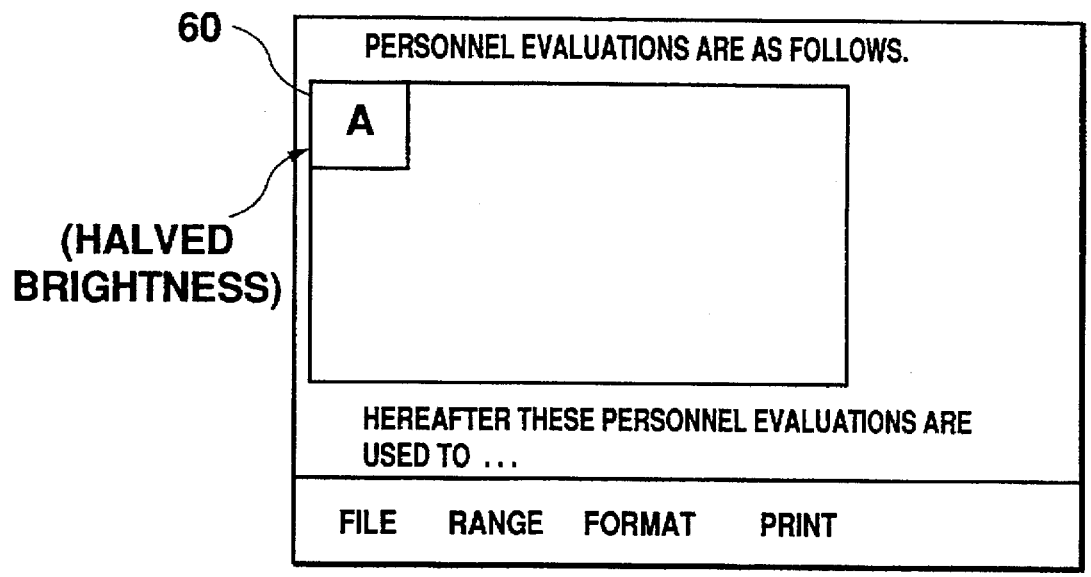
FIG. 26 depicts the secret icon appearing on the screen.

This allows the display of the menu for selecting whether that partial area is to be kept secret or not. If secret, the icon "secret" is selected (S105) to leave the system waiting for the input of the password consisting of four characters. Then, the password is input through the keyboard (S106), so that the information within the partial area is erased as shown in FIG. 26 to allow the secret icon 60 to appear in halved brightness (S110). Subsequently, the secret icon 60 is not permitted to be activated as long as the password is input, to thereby ensure the protection of the data to be kept secret.

Figure 27:
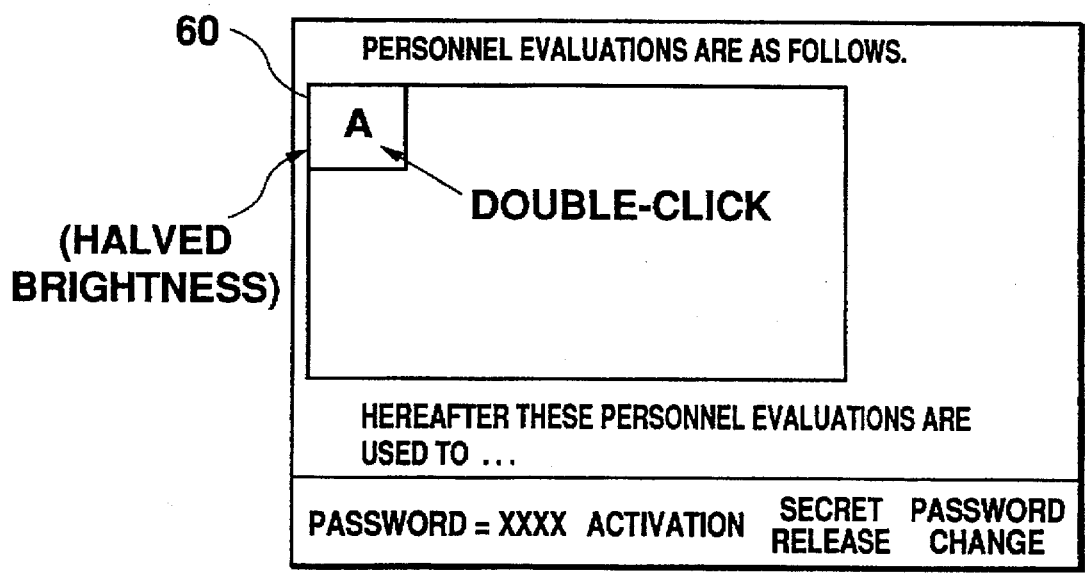
FIG. 27 is a diagram for explaining the activation of the secret icon.

On the contrary, in order to display the information within the partial area by the activation of the secret icon 60, the secret icon is clicked by use of the mouse (S201 in FIG. 3). Then, the icon activation control section 40 judges the icon to be a secret icon (S202) to change the menu on the screen into the password waiting state as shown in FIG. 27. Then, the input of the password is effected (S203). If the input password coincides with the registered password (S204), then the "activation" is input (S205) to enable the display of the information symbolized by the secret icon (S208). If the secret icon is required to be changed into the normal icon, "secret release" is merely selected after the input of the password at the stage shown in FIG. 27 (S205, S206). If it is desired to change the password which has been already registered, "password change" is selected after the input of the password (S205), and a new password is input thereinto (S207).

The following is a description of typical examples (the table icon, image icon, and sound icon) of the multi-media attribute.

Figure 31:
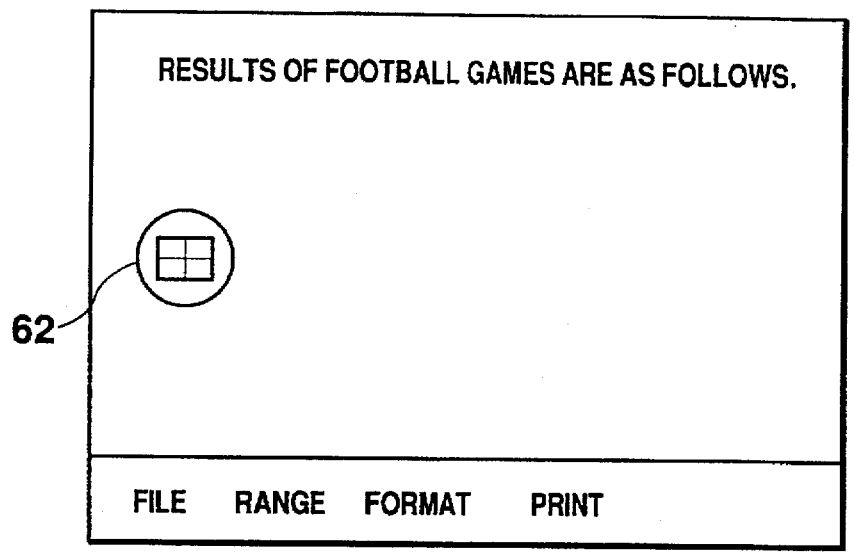
FIG. 31 depicts the table icon (serving also as the position icon) being displayed.

FIG. 28 illustrates a list showing the results of football games. The table icon is displayed by the procedure comprising the steps of subjecting the table to the designation of the partial area (S101), selecting the icon display (S102), selecting the position icon as shown in FIG. 29 (S104), and selecting "table" as the multi-media attribute as shown in FIG. 30 (S107) to allow the table icon 62 to be displayed as shown in FIG. 31 (S109). It is to be noted that the multi-media attribute may be automatically judged by the icon display control section 38 at S107 in FIG. 2, with the omission of S107. The order of selecting the three icons is not limited to that shown in FIG. 2.

Figure 32:
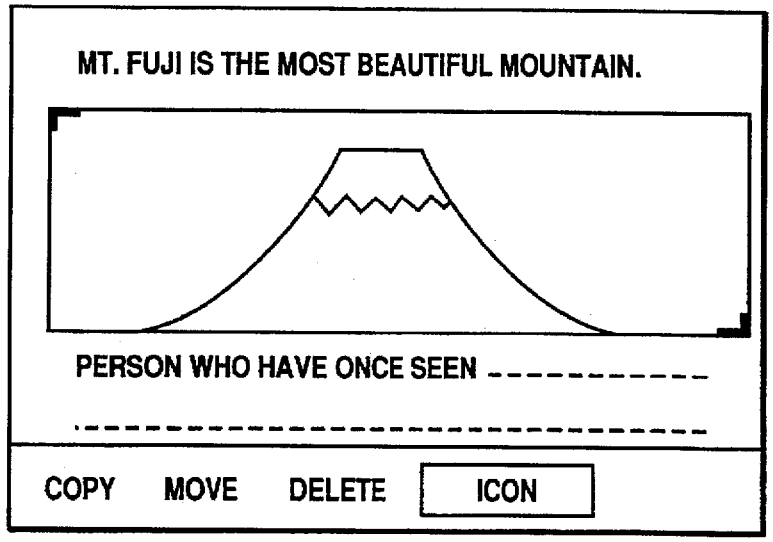
FIG. 32 depicts the setting of a partial area surrounding an image.
Figure 33:
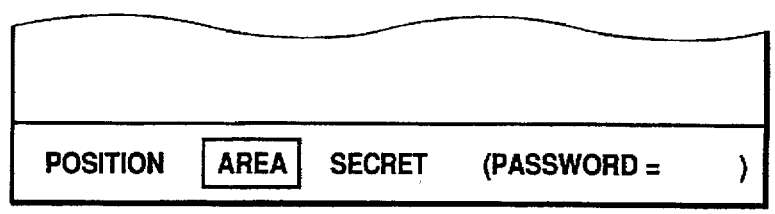
FIG. 33 depicts the selection of the area icon on the menu.
Figure 34:
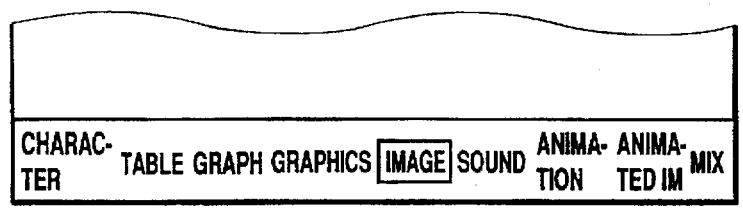
FIG. 34 depicts the selection of an image icon on the menu.
Figure 35:
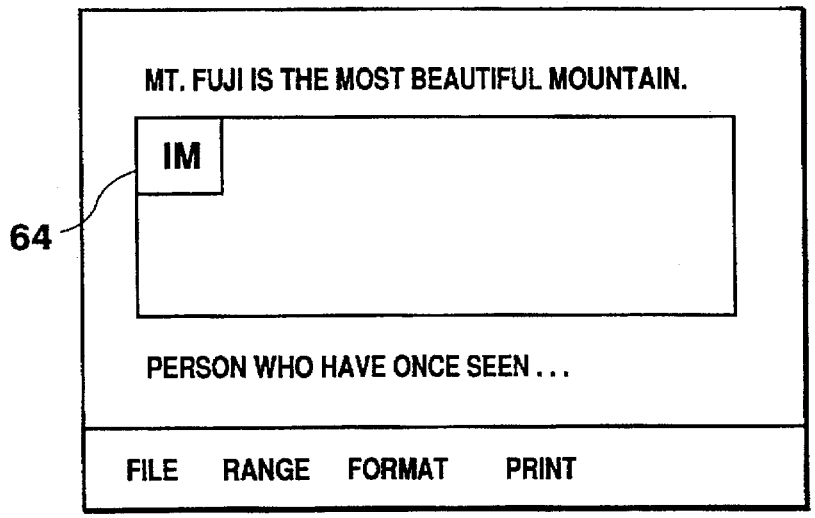
FIG. 35 depicts the image icon (serving also as the area icon) being displayed.

FIG. 32 illustrates a document including an image. The image icon is displayed by the procedure comprising the steps of subjecting the image to the designation of the range (S101), selecting the "icon" on the menu (S102), selecting the "area" (area icon) on the menu as shown in FIG. 33 (S104), and selecting the "image" on the updated next menu (S107) to allow the image icon 64 to be displayed as shown in FIG. 35 (S110).

Figure 36:
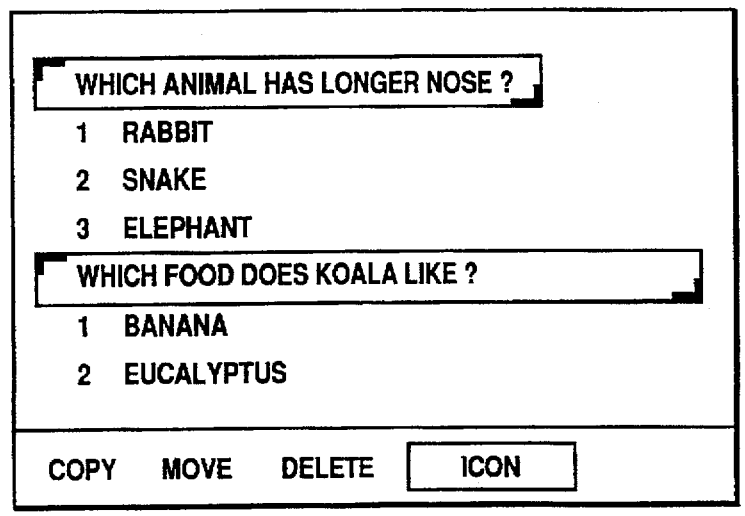
FIG. 36 is a diagram showing the setting of the partial areas.
Figure 37:
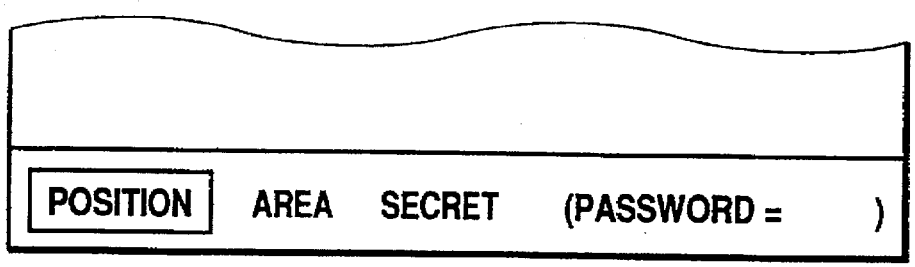
FIG. 37 depicts the selection of the position icon on the menu.
Figure 38:
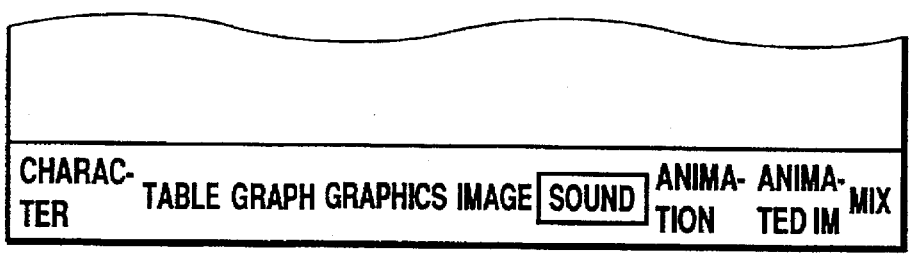
FIG. 38 depicts the selection of a sound icon on the menu.
Figure 39:
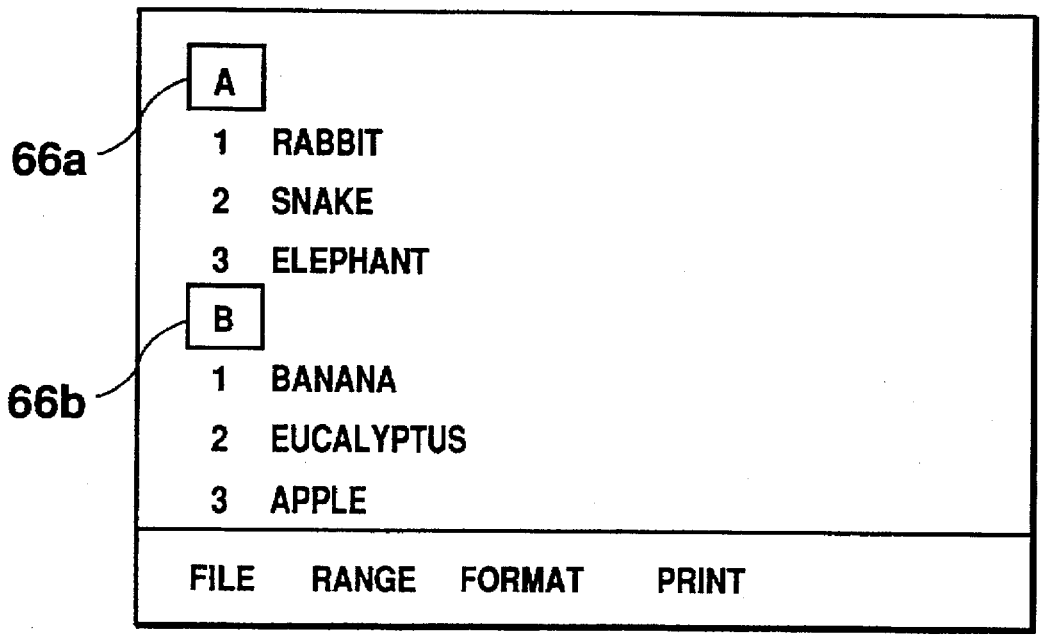
FIG. 39 depicts the sound icon (serving also as the position icon) being displayed.

FIG. 36 depicts a document including a text consisting of questions and their answers. The sound icon is displayed by the procedure comprising the steps of subjecting, for example, two question portions constituting the text data to the designation of the range (S101), selecting the "icon" on the menu (S102), selecting the "position" on the menu as shown in FIG. 87 (S104), and selecting the "sound" on the menu as shown in FIG. 38 (S107) to allow the sound icons 66a and 66b to be displayed as shown in FIG. 38 (S109).

When the sound icon 66 is double-clicked (S201), the icon activation control section 40 judges the necessity of executing an application program (AP) to, if necessary, activate the AP (in this case, sound synthesis program) (S208), thus allowing the text data symbolized by that sound icon to be converted into voice signals for the output of voice through the loudspeaker not shown. In this example, the questions are output as voice since they undergo the designation of the range.

The following is a description of functions of the icon editing section 42.

Figure 40:
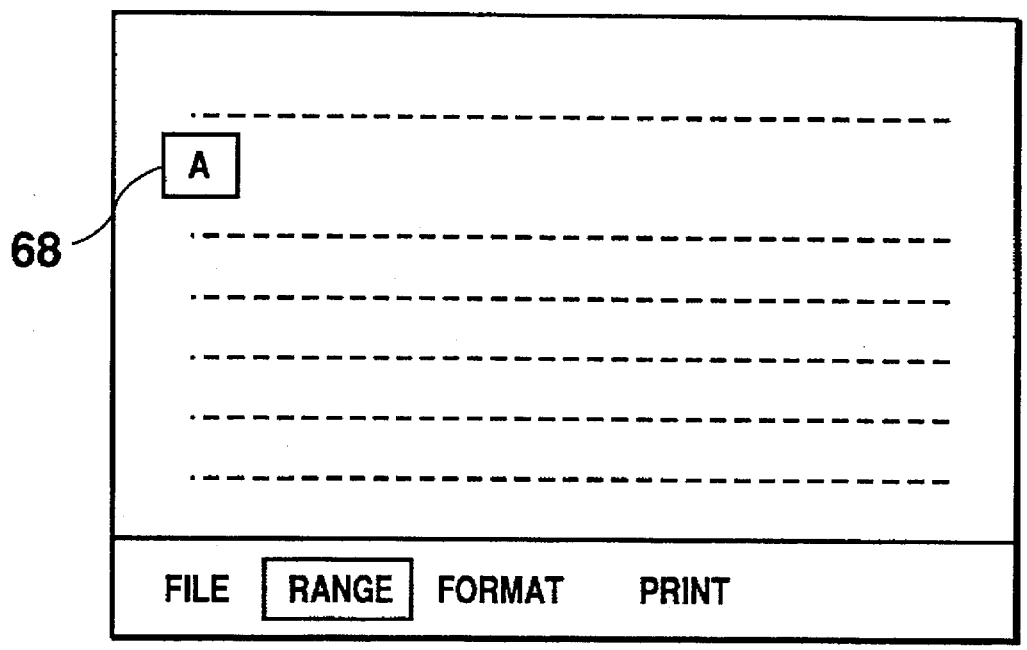
FIG. 40 is a diagram showing a document containing an icon.
Figure 41:
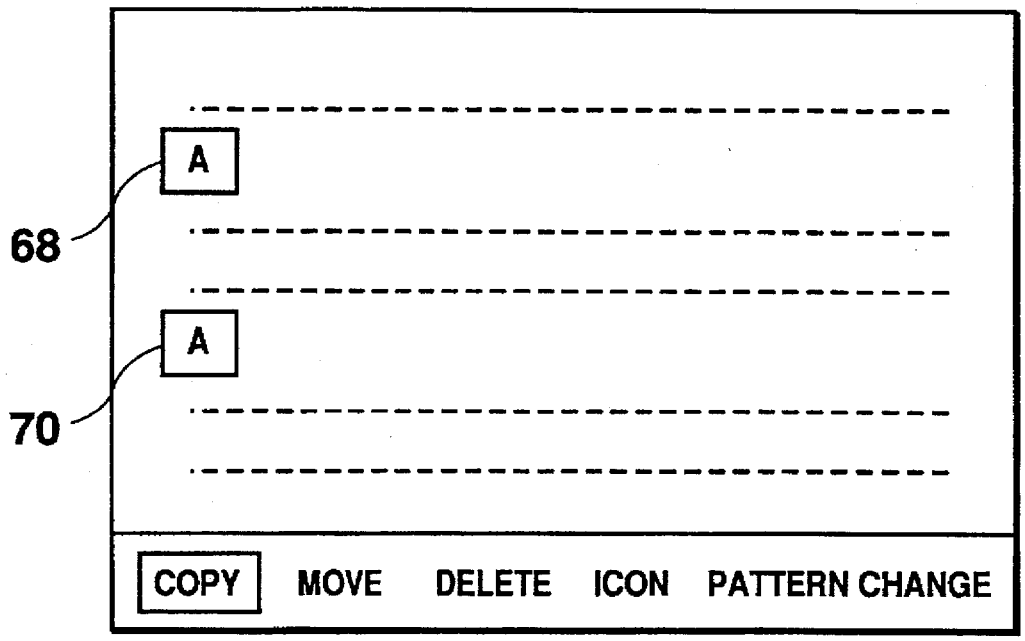
FIG. 41 is a diagram for explaining the copy of the icon.
Figure 42:
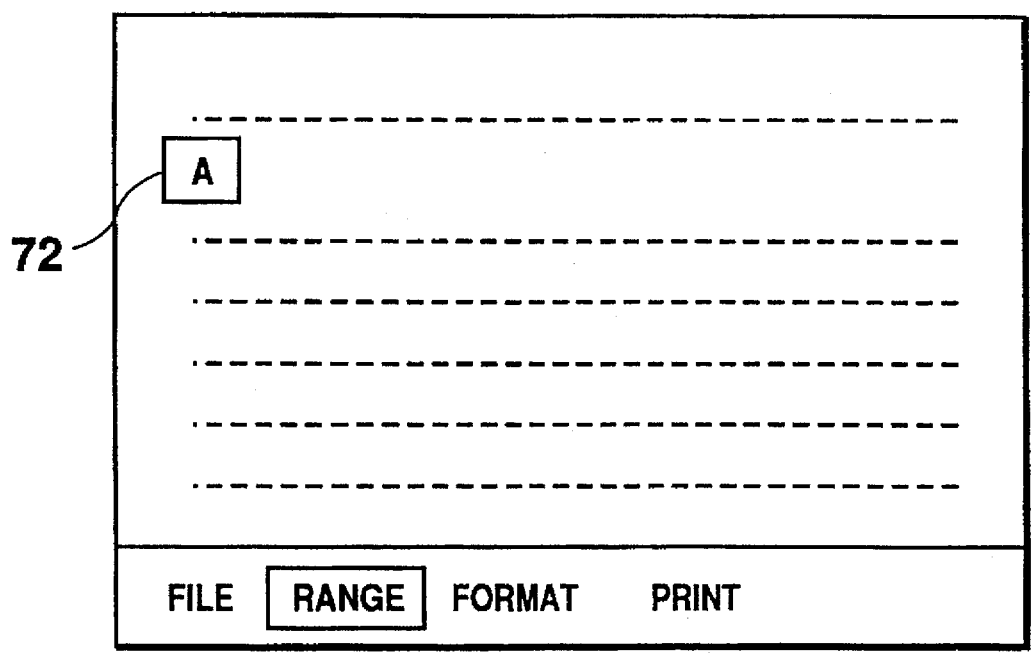
FIG. 42 is a diagram showing a document containing an icon.

In the system 10 of this embodiment, the icon may be the object of editing. For the copy of the information within the partial area, the "range" is first selected to specify an icon 68 itself as shown in FIG. 40. Then, the "copy" is selected with the destination thereof specified as shown in FIG. 41, to thereby copy the icon 68 to produce an icon 70. In this case, the copy of the icon means a copy of the information symbolized by the icon, which ensures a simple editing by use of the icons without directly subjecting the information within the partial area to the designation of the range.

Figure 43:
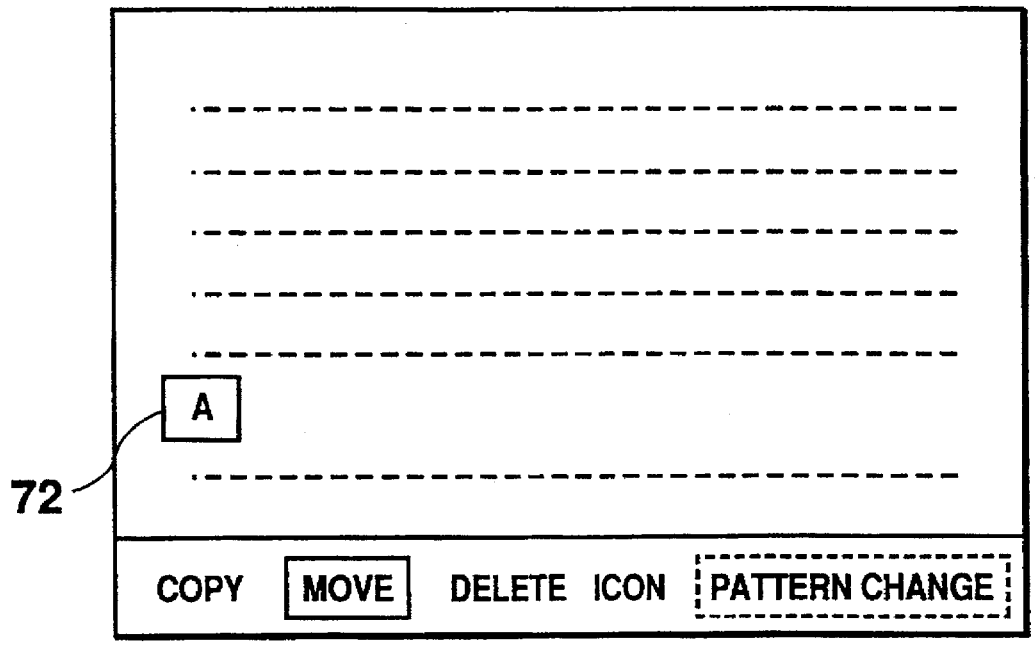
FIG. 43 is a diagram for explaining the move of the icon.

On the contrary, for the movement of the partial area, "range" is selected from the menu to specify an icon 72. Then, "move" is selected from the menu to specify the destination of the movement. Thus, the icon 72 is moved to the specified destination together with the partial area as shown in FIG. 43.

The case where the icon includes other icons will be hereinafter described.

Figure 44:
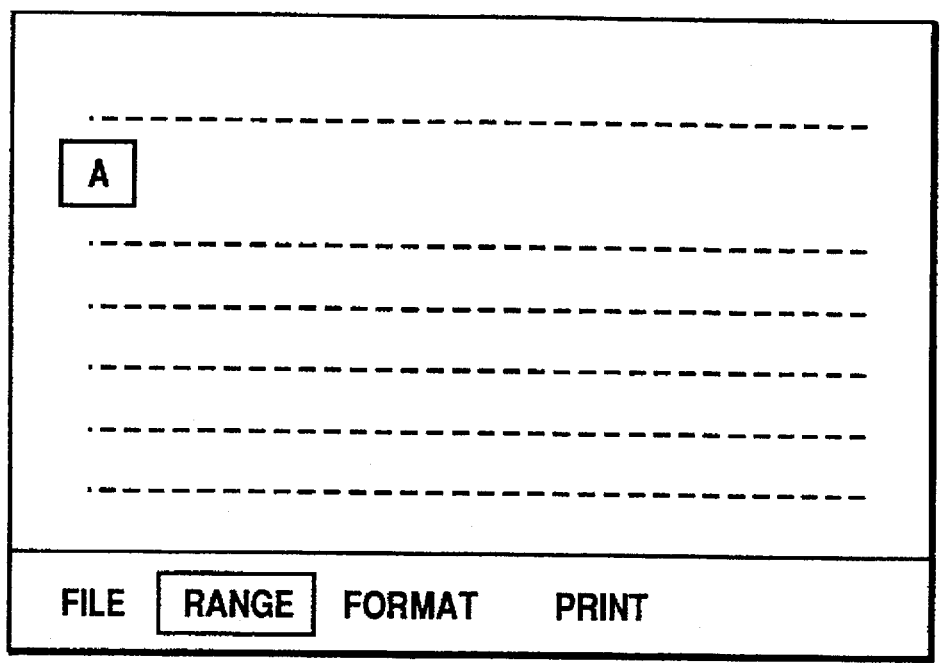
FIG. 44 is a diagram showing a document containing an icon.
Figure 45:
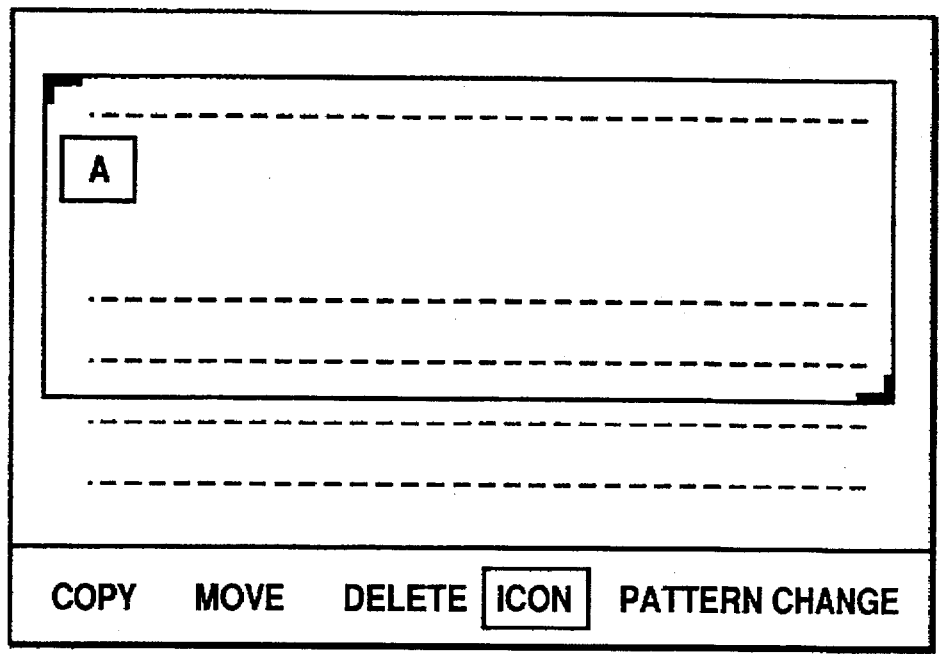
FIG. 45 is a diagram showing the setting of a partial area containing the icon.
Figure 46:
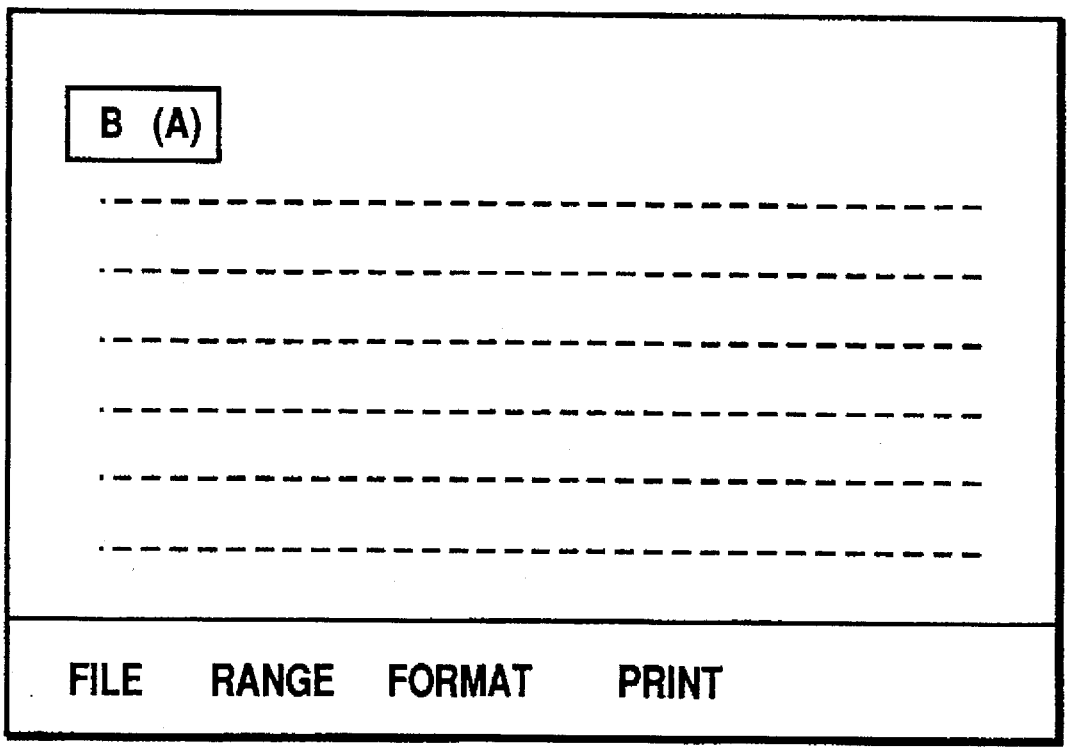
FIG. 46 depicts an icon B containing an icon A.

As shown in FIG. 44, the "range" is selected on the menu with the icon A being displayed. Then, as shown in FIG. 45, the area including the icon A is framed for the designation of the range. Then, the "icon" is selected to allow a new icon B to be displayed as shown in FIG. 46. Here, the icon B includes the parenthesized icon A, thus clarifying the relation between the two icons.

Figure 47:
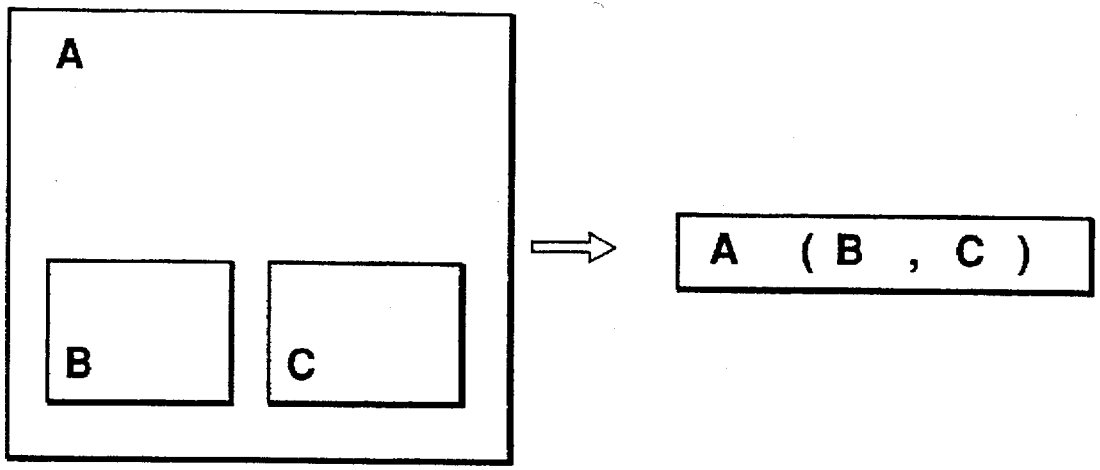
FIG. 47 is a diagram showing the relation among three icons.
Figure 48:
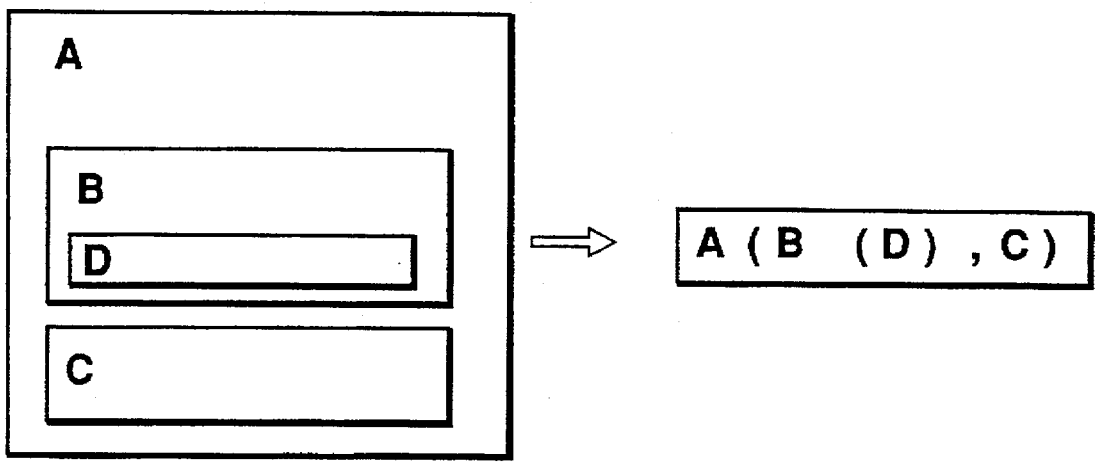
FIG. 48 is a diagram showing the relation among four icons.

FIGS. 47 and 48 depict other examples. In the example shown in FIG. 47, the icon A includes both the icon B and an icon C, and is expressed as "A (B, C)". On the other hand, in the example shown in FIG. 48, the icon A includes both the icon B and the icon C, the icon B further including the icon D, whose relationship is expressed as "A (B (D), C)". In this manner, a partial area may further include another partial area.

Figure 49:
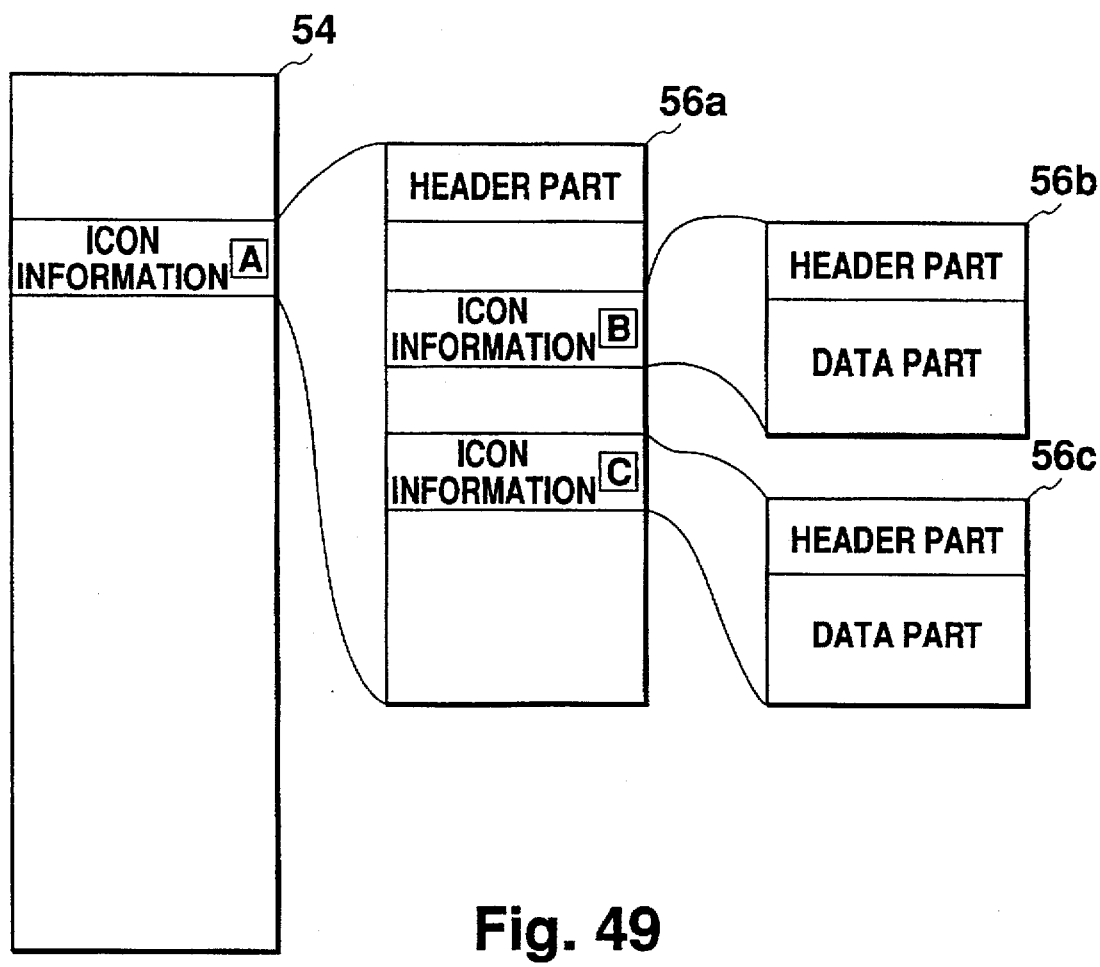
FIG. 49 depicts the relation between a document file and icon information.

FIG. 49 depicts a file format. A document file 54 includes the icon information 56a of the icon A which in turn includes the icon information 56b of the icon B and an icon information 56c of the icon C.

Description will next be given of the activation of the application programs. The example described hereinbelow differs somewhat from the process shown in FIGS. 2 and 3 in that the selection of the multi-media is carried out at the time of icon activation.

Figure 50:
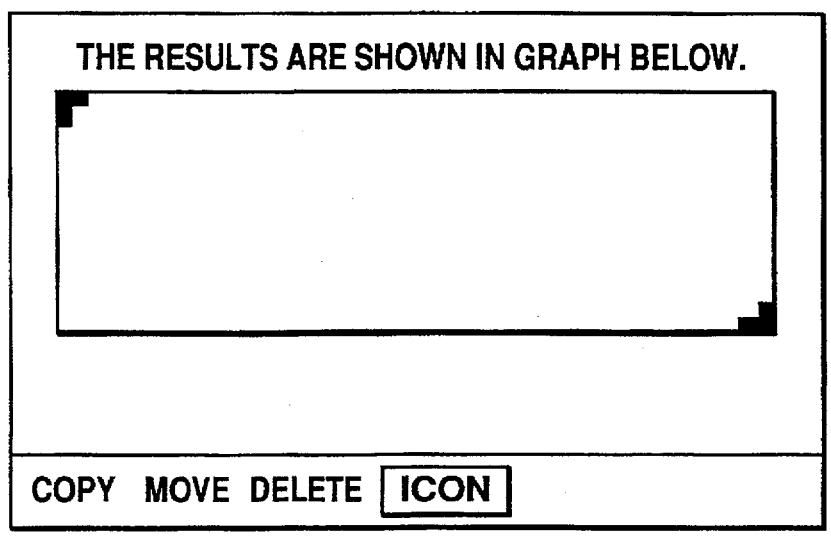
FIG. 50 is a diagram showing the setting of a partial area.
Figure 51:
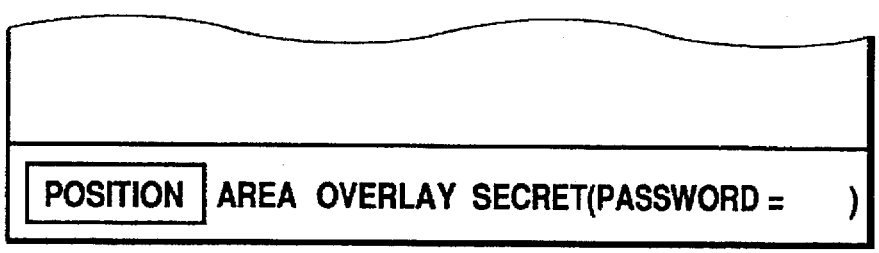
FIG. 51 depicts the setting of the position icon on the menu.
Figure 52:
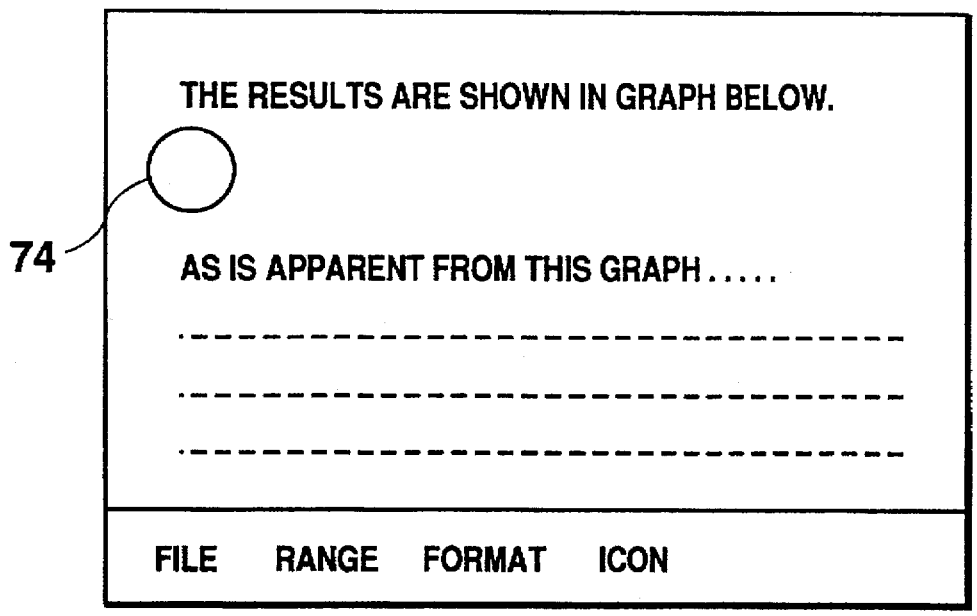
FIG. 52 depicts the position icon appearing on the screen.

In the case of inserting, for example, a graph into a document, a partial area is first set as shown in FIG. 50. Then, the "icon" is specified on the menu, and the "position" is selected on the menu as shown in FIG. 51 to allow a position icon 74 to be displayed as shown in FIG. 52. It is to be appreciated that this icon undergoes only the designation of the layout attribute but does not undergo the designation of the multi-media attribute. Therefore, the position icon is constituted of a simple circle.

Figure 53:
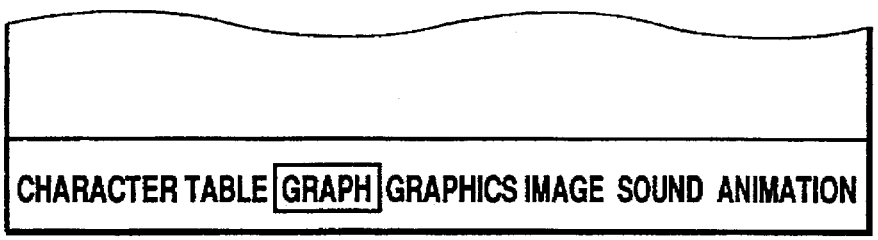
FIG. 53 depicts the selection of a graph icon on the menu.
Figure 54:
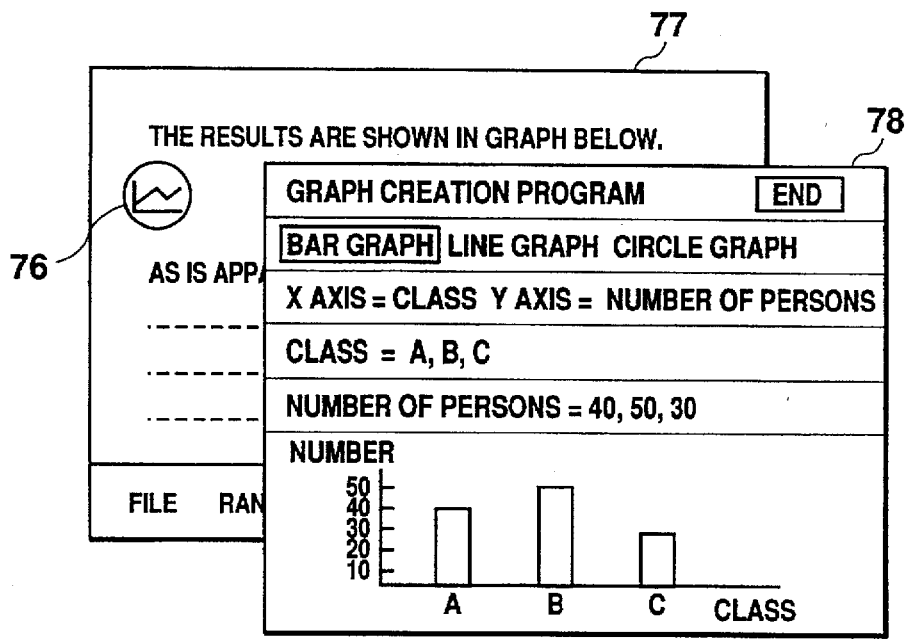
FIG. 54 is a diagram for explaining the activation of a graph creation program.

When the icon 74 is activated, the menu shown in FIG. 53 appears since the multi-media attribute has not yet been selected. Then, the "graph" is selected. Thus, a graph is displayed in the icon 74 to form a graph icon 76 as shown in FIG. 54, while at the same time automatically activating a graph creation program. In FIG. 54 example, the activation of the program allows an application window 78 separately from an editing window 77 to be opened.

For example, a menu for creating the graph is displayed within the window 78 in accordance with this graph creation program. Thus, for example, the operator selects "bar graph", and inputs "class" as a parameter of x-axis, and "the number of persons" as a parameter of y-axis. Then, "A, B, C" are input as specified class data, and "40, 50, 30" are input as the data of the number of persons corresponding to the class. Thus, within the window 78 there appears a graph created based on the above-mentioned data input.

The termination of the graph creation program permits the graph within the window 78 to be stored into icon information 56 of the icon 76.

Figure 55:
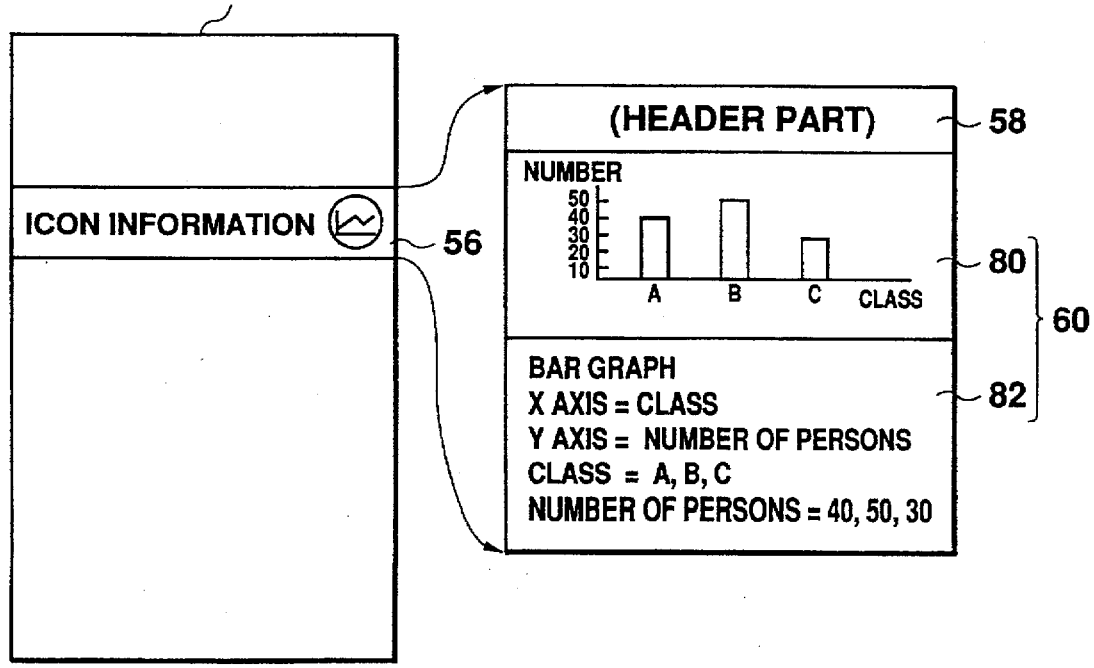
FIG. 55 depicts the relation between a document file and icon information.

FIG. 55 depicts an example of a file format in that instance. The icon information 56 is inserted into the document file. The icon information 56 comprises a header part 58 and a data part 60. The data part 60 includes display / print data composed of a graph image, and source data 82 which has been input for the creation of the graph. In the case where specifications for the display data are different from those for the print data, the display data and the print data may be separately stored.

The activation of the thus set icon automatically ensures the activation of the graph creation icon and opening of the window. Any necessary modification and editing may be made within the window. Where the graph creation program is terminated after the modification of the graph, the icon information is modified.

According to the system of this embodiment, a partial area is set partly in the document so that the partial area can be correspondingly associated with an icon. More specifically, as shown in FIG. 56, the designation of a graph in a document as its partial area enables an icon symbolizing the graph to be displayed instead of the graph. This may be called "iconization" of the partial region.

Figure 57:
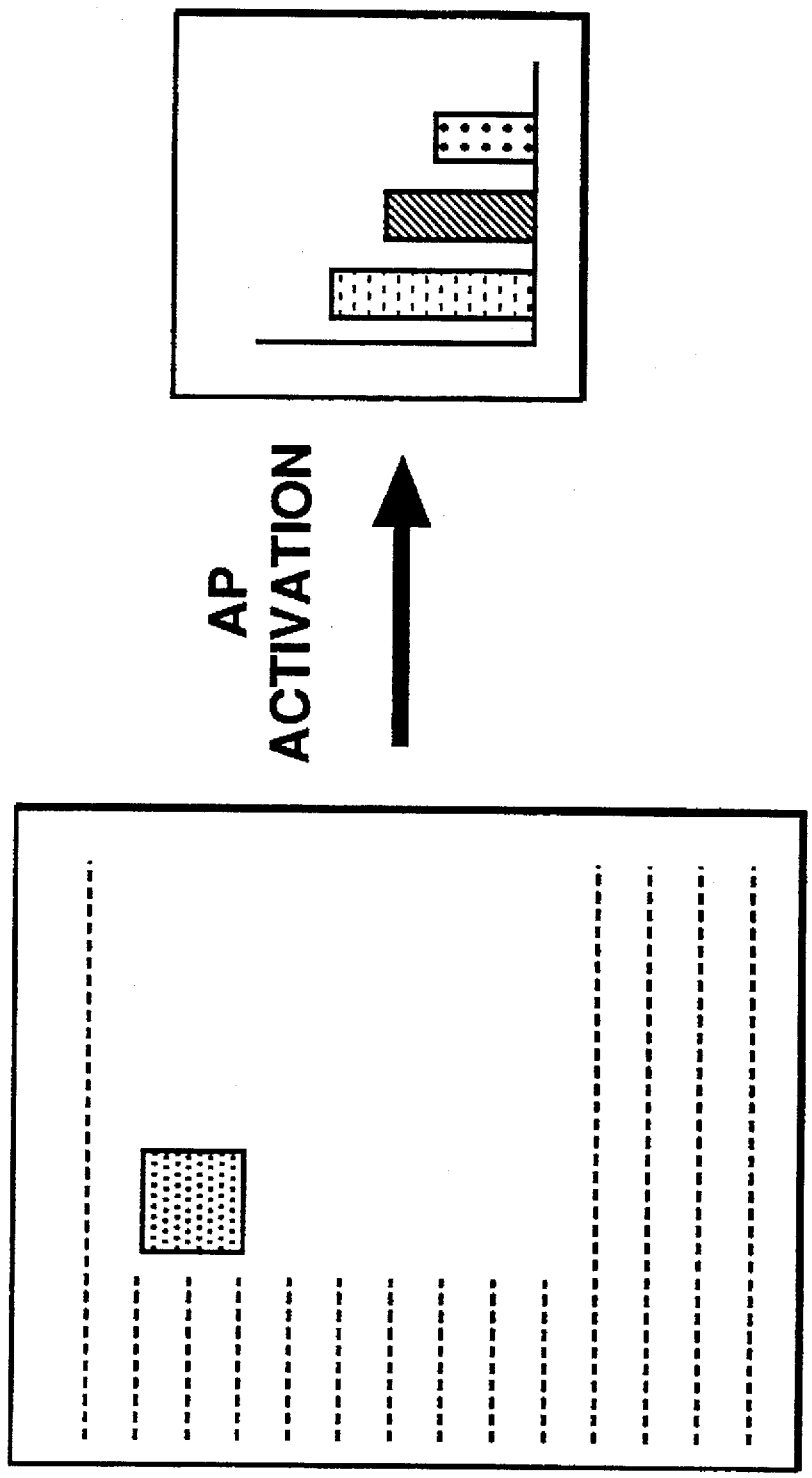
FIG. 57 is a diagram for explaining that the activation of the icon automatically causes the activation of an application program.

According to the system of this embodiment, as shown in FIG. 57, the activation of an icon enables the information within the partial area symbolized by the icon to return onto the screen. In such case, if the activation of a specified application program is associated with the information within the partial region, the activation of the icon may automatically result in the activation of the application program.

The following is a description of the action of the icon print control section 46.

The icon print control section 46 has a first print mode and a second print mode. The first print mode allows the icon to be printed as simple graphics at the time of printing a document (S302 in FIG. 4). On the contrary, the second print mode, if an icon is contained, allows the information within a partial area symbolized by the icon to be printed back upon printing the document (S307). In other words, the icon is printed in the first mode, but is not printed in the second mode.

It is judged at S303 in FIG. 4 whether a secret icon is included within the document or not. Control may be then passed through S304 where the input of a password is performed by the operator to S305 for judging whether thus input password is coincident with the registered password.

The first print mode ensures a shortening of the printing time since the icon is printed as it is with the omission of print of the complicated graph or the image. On the contrary, the second print mode ensures a print of a perfect document. When printing the overlay icon in the second print mode, two data are superimposed together for printing.

In the case where a position icon is contained in a document, an attempt to print the document in the second print mode may result in a difficulty in printing with a superior layout. For this reason, the icon print control section 46 has a re-layout function to cope with such case (S306).

Figure 58:
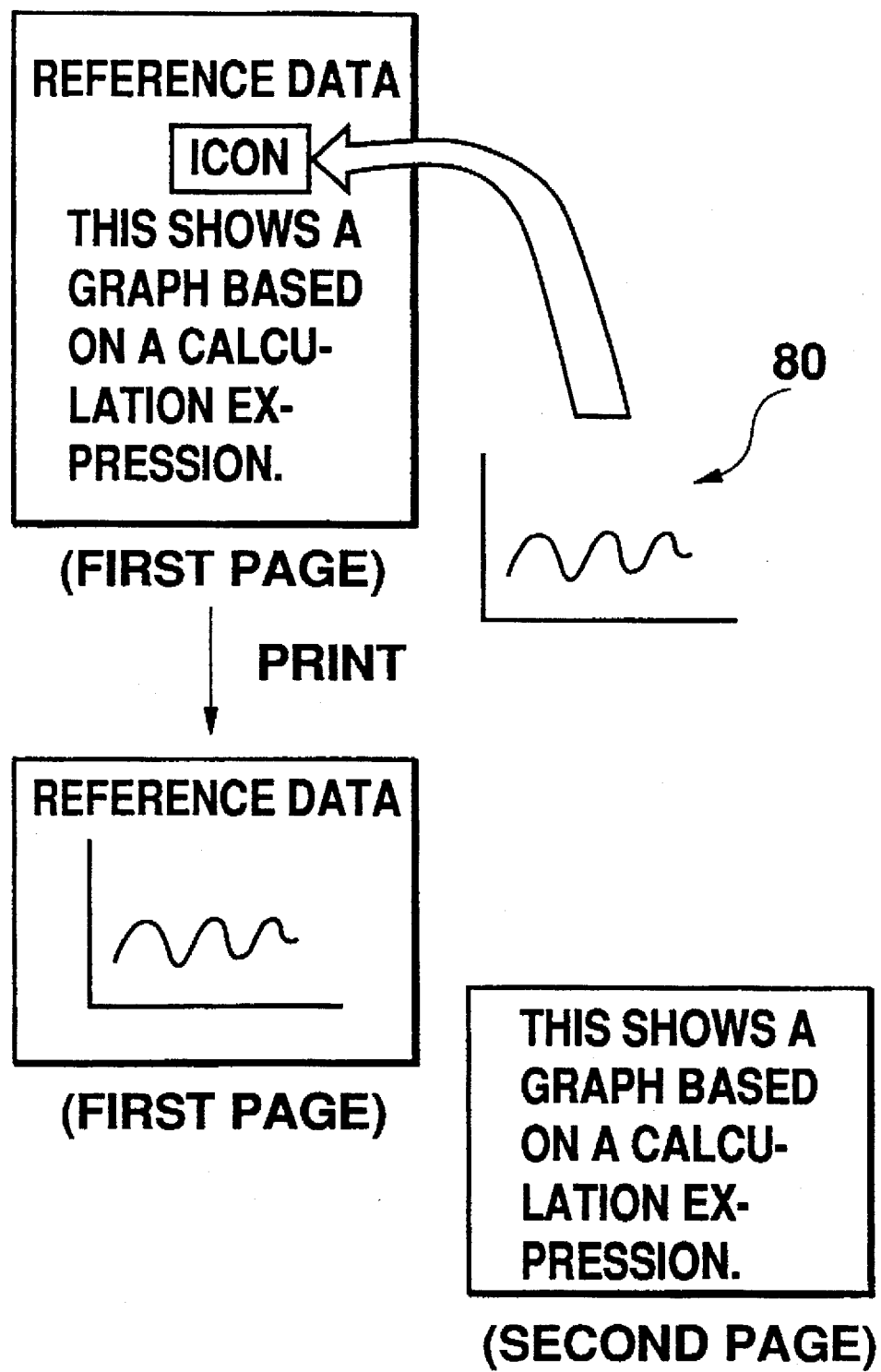
FIG. 58 is a diagram for explaining the re-layout in a second print mode.

FIG. 58 depicts a document containing a position icon having as its data a graph 80. If the document is printed in the second print mode, the data existing behind that icon may be printed over two contiguous pages which may impair the continuity of the data displayed. For this reason, this embodiment carries out a re-layout if desired in view of such a case. For example, as shown in FIG. 58, a graph is printed on the first page, and text is printed on the second page even if a blank portion remains on the first page.

Re-layout may be carried out by a variety of methods. It is however preferred that data such as a graph or an image having a display continuity are not allowed to be printed over two contiguous pages. To this end, there may be provided a step of judging the data requiring a display continuity so that the re-layout can be effected if it is judged that the re-layout is necessary.

Description will next be given of the functions of the header part 58 constituting the icon information. FIG. 59 illustrates a concrete construction of the header part.

"Identifier" 81 is identification information for identifying the attribute of the icon. The attribute of each icon is identified by referring to the "identifier".

"AP file name" 82 is a file name of an application program correspondingly associated with an icon. At the time of activation of the icon, the icon activation control section 40 refers to the "AP file name".

"Source data file name" 83 is a name of a file storing data used as a base for the execution of the application program. As shown in FIG. 55, the source data 82 is ordinarily stored within the icon information, but may be stored within other files by utilizing the "source data file name" 83.

"Pass name of AP file name / source data file name" 84 is a pass name to which a reference is made when accessing a file of an application program. "Pass name of source data file name" is a pass name to which a reference is made when accessing a file designated by a source data file name.

"Display / print data size" 85 is a memory size of data for the display and print. Where the display data differ in size from the print data, respective sizes are separately stored.

"X size and Y size" 86 and 87 indicate the vertical and transverse lengths in the case where the display / print data are displayed on the screen or printed on print paper. Where the display data are different in size from the print data, respective sizes are separately stored in the units of cm, inch, or BMU.

"Source data format" 88 indicates a data format of the source data. The source data format to be specified includes a text file format in ASCII code, SYLK format, TIFF format, GKS format, CORE format and GIS format. It is preferable to employ the data format compatible with the other application programs.

"Display process class" 89 is a flag for identifying whether to display the icon or the data such as a graph or a chart created by the application program. The "display processing class" 89 enables an arbitrary display manner to be set.

"Display process activation timing" 90 indicates a timing to display a process result of an application program. It is to be understood that the timing may include, for example, (i) when a distinctive activation instruction from the user is received;

(ii) when a document editing process is started;

(iii) when data is loaded; and (iv) when the document editing process is terminated.

"Icon file name" 91 is a file name storing a pattern of an arbitrarily prepared icon.

"Print application file name" 92 is a file name of a print application program to be activated, if present, which is to be designated when a document is printed.

"Print activation timing" 93 is a timing to execute a print, the timing including, for example, (i) when a distinctive activation instruction is received from the user;

(ii) when a document editing process is started;

(iii) when data is loaded; and (iv) when the document editing process is terminated.

"Print process class" 94 is intended to specify the print modes described above.

"AP area" 95 is an area to be used by the user application program, which, if necessary, may store information such as version names, area names, comments, etc.

"Password" 96 is to be set for a secret icon.

"Termination identifier" 96 means the termination of the header part.

The following is a description of the execution of application programs.

Figure 60:
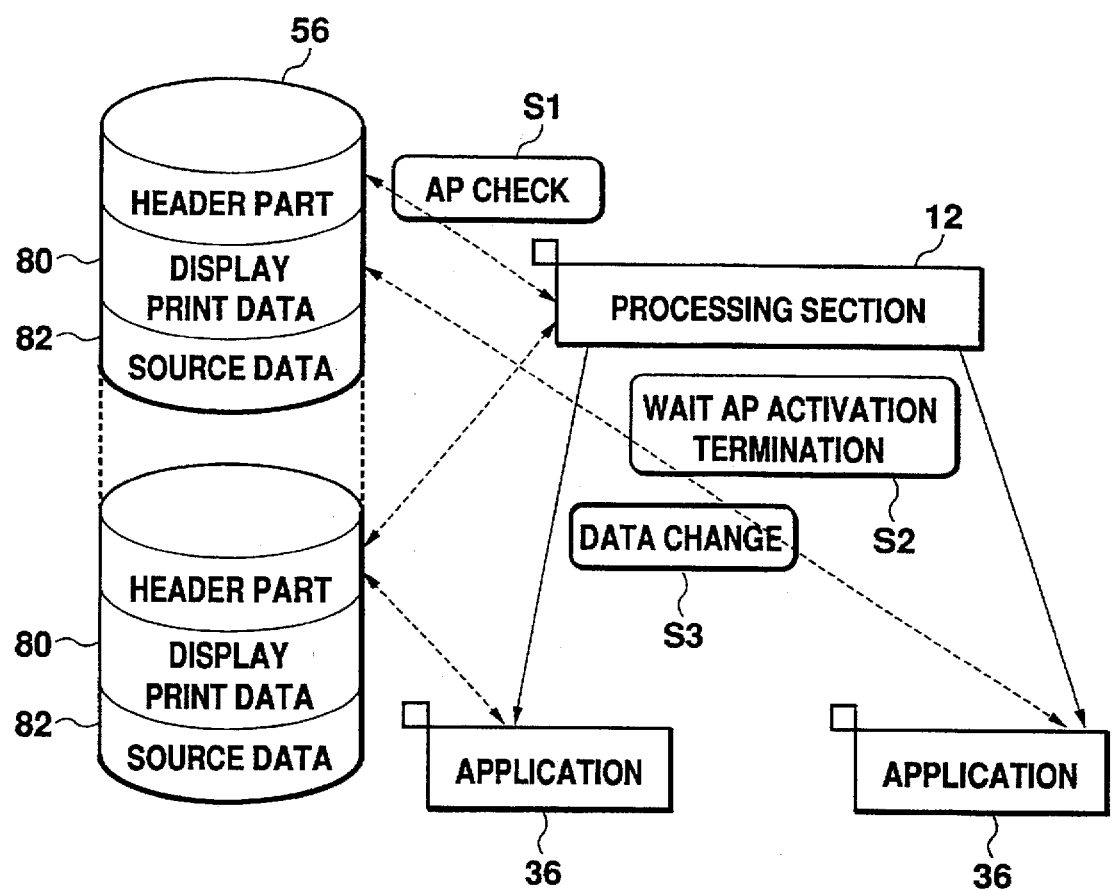
FIG. 60 is a diagram for explaining the action of a processing section and application programs.

FIG. 60 diagrammatically shows the interrelation among the icon information 56, the application programs 36, and the processing part 12. It is to be noted that in the configuration of FIG. 1 the application programs 36 lie inside the processing part 12, but that in the configuration of the application programs 36 lie outside the processing section 12.

When the processing unit 12 detects a double-click for an icon by the operator, it judges whether an application program has been designated or not with reference to the icon information of that icon (S1). If it is judged that the designation is present, the processing unit 12 activates the application program 36 designated by the "AP file name" of the icon information 56, and it stands by until the termination of the application process (S2). When the application process is terminated and the processing section 12 receives a notice that the program has duly terminated, the processing section 12 controls to store the execution results of the application program 36 into the data parts 80 and 82 within the icon information 56. It is to be appreciated that if the application program has been unduly terminated the data parts 80 and 82 are not updated. In the case where the processing section 12 itself comes to an abnormal termination or compulsory termination during the execution of the application program 36, the processing section 12 sends out signals indicating such state to the application program 36.

Further description will now be given of the execution of the application programs 36. If the data format to be dealt with by the application program 36 differs from the data format used in the processing section 12, then the application program 36 serves to convert the data format into its own data format with reference to the "source data format" 88 (S3). Then, the thus converted data are subjected to the application process. Afterwards, the application program 36 feedbacks to the processing section 12 whether the application process has terminated duly or unduly.

It will be understood that the data sections 80 and 82 are updated by the processing section 12 in the above, but that they may be updated by the application program 36 in accordance with its execution results.

The configurations of the icon information are not confined to the examples shown in FIGS. 14, 49 and 60, and the data which are the execution results of the application program may be stored within separate files. In that instance, the file name to store the execution results must be registered in the header part 58.

Figure 61:
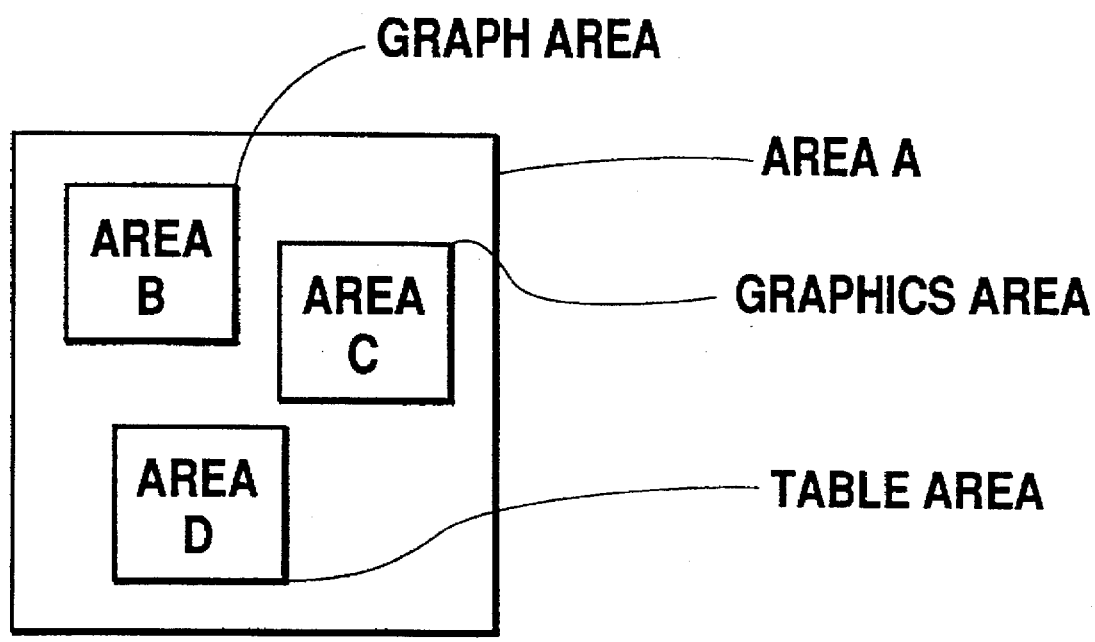
FIG. 61 is a diagram showing a document containing a plurality of partial areas.

The operation of the inter-areal relation defining section 44 will be hereinafter described. In FIG. 61, reference marks are imparted to respective partial areas. The document A includes a partial area B, partial area C and partial area D, where the partial area B is a graph area, the partial area C is a graphics area, and the partial area D is a table area.

Among the respective areas there are established relational expressions:

(a) area B=graph (area D)

(b) area C=graphics (area D)

(c) area A=area B+area C+area D

The expression (a) means that the graph in area B is prepared from table data in area D. The expression (b) means that the graphics in area C is prepared from the table data in area D. The expression (c) means that the area A consists of the area B, the area C and the area D.

In this manner, the definition of the interrelation in the form of relational expressions enables data of one area to be produced from the data of the other area, and enables the change in data content of one area to be interlocked with the change in the data content of the other area.

For example, the change in the data content of the area D results in the change in the data content of the areas B and C.

Figure 62:
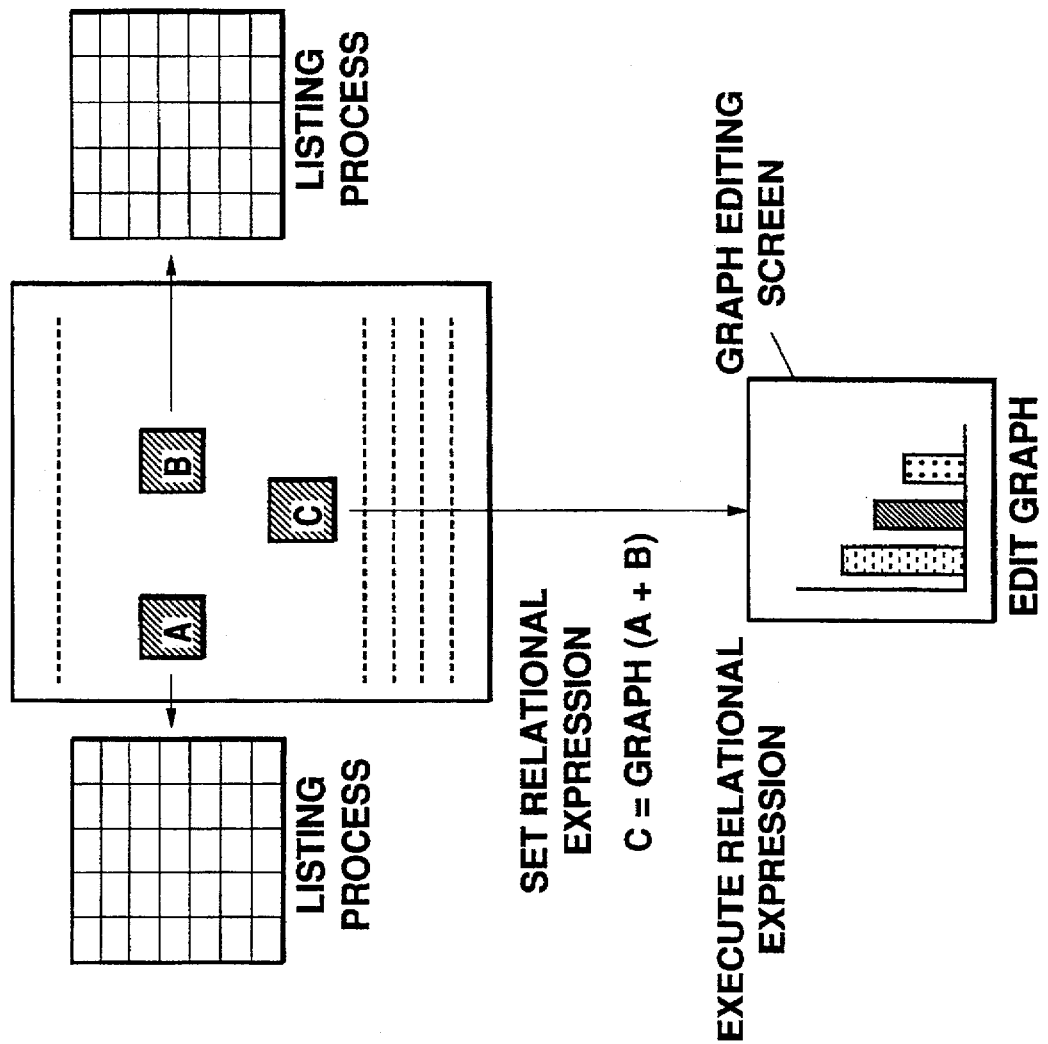
FIG. 62 is a diagram showing an interrelation among a plurality of partial areas.

FIG. 62 depicts the setting of the relational expressions using the icons.

As shown, the icon A is correspondingly associated with the application program for the creation of the table, and likewise the icon B is correspondingly associated with the application program for creating the table, each having table data. Herein, if the relational expression (d) C=graph (A+B)

is defined, then the icon C is allowed to be correspondingly associated with a graph creating application program, thus displaying as a graph the results obtained by adding the table data of the icon A and the table data of the icon B together. In the case where a change is made in the table data of the icon A or B, the application program serves to change the graph based on the modified table data in accordance with the above calculation expression.

The present invention is not limited to the abovedescribed examples in which the iconized partial areas are set in units of lines.

Figure 63:
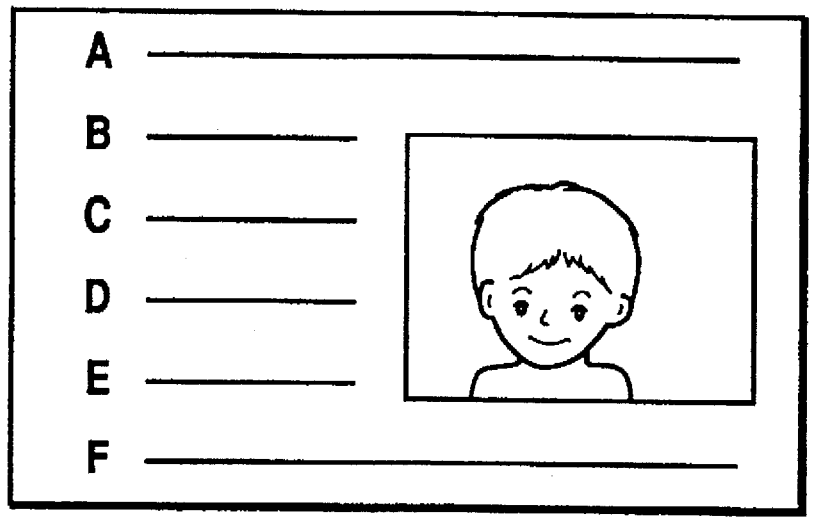
FIG. 63 is a diagram showing an image area having a halved transverse length.
Figure 64:
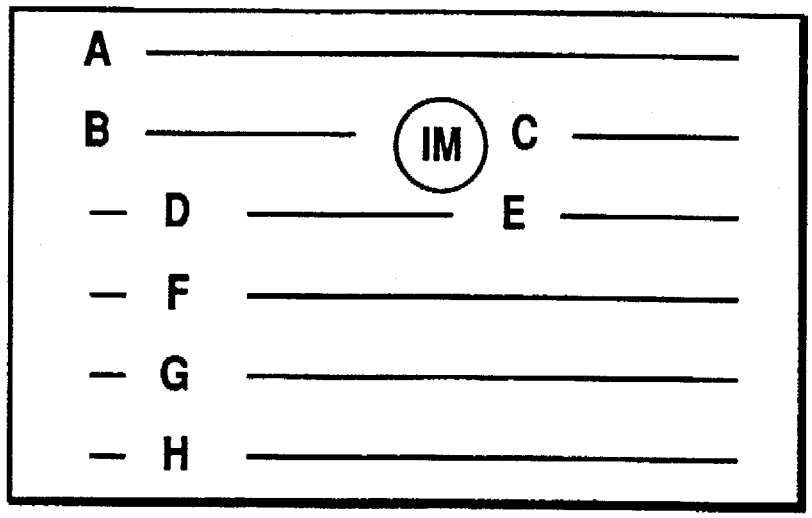
FIG. 64 is a diagram showing an image icon.

In the example shown in FIG. 63, a human face is inserted into a document as an image. The image area has a transverse dimension equal to half of one line. When iconizing this image area, there appears an image icon (a position icon) as shown in FIG. 64. Herein, a text (C) immediately beside the image area is allowed to move to the right side of the image icon.

Providing that the original areal configuration information is to be contained within the icon information of the icon, there can be obtained a document as shown in FIG. 63 with the original layout when the icon is activated.

Figure 65:
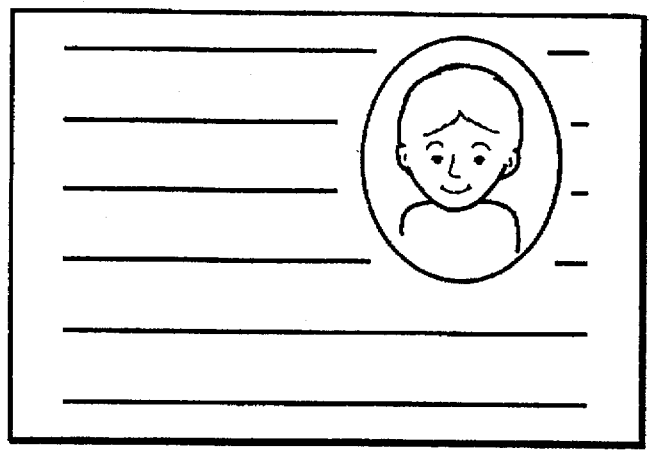
FIG. 65 is a diagram showing an oval partial area.
Figure 66:
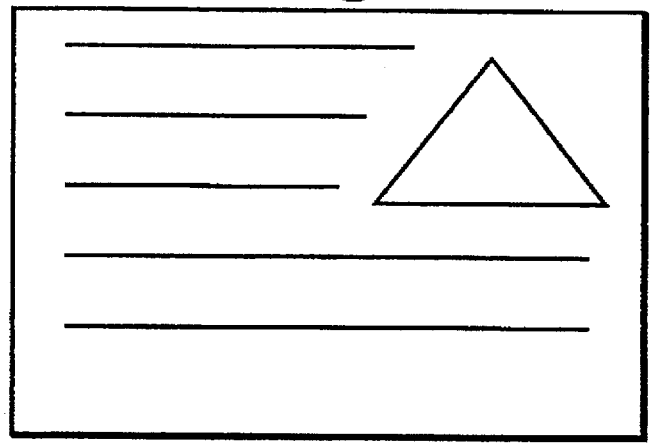
FIG. 66 is a diagram showing a triangular partial area.

Referring to FIG. 65, an image area of oval configuration is inserted into the document, which area may also be iconized. Likewise, there may be iconized such a triangular image area as is shown in FIG. 66.

Figure 67:
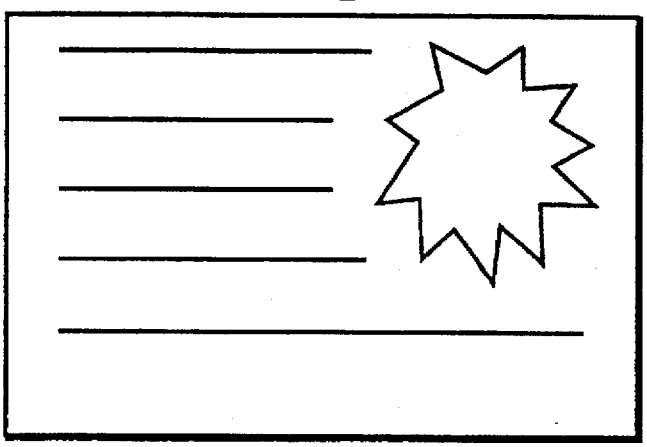
FIG. 67 is a diagram showing a partial area having a complicated shape.
Figure 68:
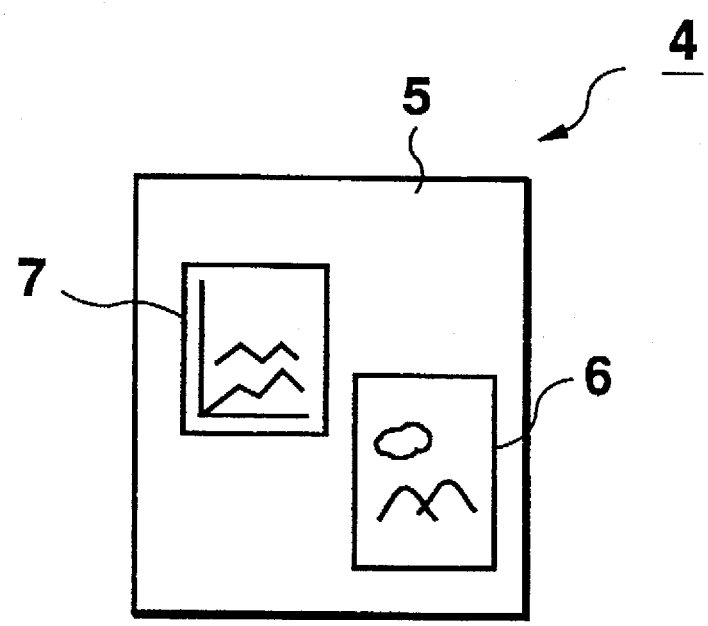
FIG. 68 depicts an example of a typical document containing an image and a graph.

Further, there can be also iconized a more complicated area as shown in FIG. 67. In this case, the graphics data prepared by use of a graphic creating unit can be wholly utilized as data for the area to be iconized.

If the area having a complicated configuration is iconized as a position icon, the layout may be come deformed. The system is therefore so controllable as not to subject such a complicated area to the selection of the position icon.

What is claimed is:

1. A system for processing information of a document, comprising:

(b) means for displaying said document on a screen;

(c) means for editing said document;

(d) means for selecting a partial area of said document, said partial area containing at least a portion of one of text and graphics of a page or pages of the document;

(e) means for associating said partial area with a corresponding icon symbolizing said partial area;

(f) display control means for displaying the corresponding icon on the screen instead of the at least a portion of one of text and graphics contained within said partial area;

(g) activation control means for restoring information within said partial area on the screen when said icon is activated;

(h) means for protecting the partial area of the document by associating the icon corresponding to the partial area with a password to provide a secret icon;

said activation control means activating said secret icon when a password specified for said secret icon coincides with the password;

wherein the means for editing includes means for copying the at least a portion of one of text and graphics within the partial area from a first position within the document to a second position within the document by copying the icon from the first position to the second position;

wherein said display control means displays the icon in one of an area icon display mode and a position icon display mode, such that in said area icon display mode all information within said partial area on the screen is removed while said partial area on the screen is maintained and an area icon is displayed at any position within said partial area, and such that in said position icon display mode all of said partial area is removed from the screen together with the information contained therein and a position icon is displayed at a position in the document where said partial area was previously present, said area icon display mode maintaining an original layout of the document, and said position icon display mode changing the original layout of the document.

2. The system for processing information of a document according to claim 1, further comprising:

(i) means for printing said document;

(j) means for selecting either a first print mode or a second print mode;

(k) print control means for controlling said printing means, said print control means, upon selection of said first print mode, allowing said icon to be printed as it appears on the screen and said control means, upon selection of said second print mode, allowing the information contained within the partial area to be printed instead of said icon.

3. The system for processing information of a document according to claim 2, wherein said print control means restores the original layout of the document if said position icon is contained in the document when printing in said second print mode.

4. The system for processing information of a document according to claim 3, further comprising:

(l) icon editing means for editing, including moving copying and deleting, said partial area by moving, copying or deleting icons.

5. The system for processing information of a document according to claim 4, further comprising:

(m) means for storing a relationship among information within a plurality of partial areas; and (n) means for editing the information in one partial area when information, defined by the relationship, in another partial area is edited.

6. A method of processing information of a document, comprising the steps of:

(a) displaying said document on a screen;

(b) designating a partial area within said document, said partial area containing at least a portion of one of text and graphics of a page or pages;

(c) associating said partial area with a corresponding icon;

(d) removing the at least a portion of one of partial text and graphics contained within said partial area and displaying said icon on the screen;

(e) copying the corresponding icon to create a second corresponding icon;

(f) moving the second corresponding icon to a position within the document to copy the at least a portion of one of text and graphics within the partial area to the position within the document;

(g) selecting either an area icon display mode or a position icon display mode;

(h) removing all information within the partial area on the screen while maintaining the partial area on the screen, and displaying an area icon at any position within the partial area when the area icon display mode is chosen in step g;

(i) removing all the information within the partial area on the screen and the partial area, and displaying a position icon at a position in the document where the partial area was previously present, when the position icon display mode is chosen in step g; and (j) protecting the partial area of the document by associating the icon corresponding to the partial area with a password to provide a secret icon.

7. The method of processing information of a document of claim 6, further comprising the steps of:

associating a whole of said document with a first icon; and indicating with the first icon that an area of the document corresponds to a second icon.

8. The method of processing information of a document according to claim 6, further comprising steps of:

selecting either a first print mode or a second print mode;

printing the icon as it appears on the screen at the time of printing the document when the first print mode is chosen;

printing the information symbolized by the icon instead of the icon when the second print mode is selected.

9. The method of processing information of a document according to claim 6, further comprising steps of:

restoring the information within the partial area to the screen upon activation of the icon.

10. The method of processing information of a document according to claim 6, further comprising steps of:

storing a relationship among a plurality of partial areas; and editing the information in one partial area when related information, defined by the relationship, in another partial area is edited.

11. A document processing system comprising:

a display that displays a document on a screen; and an icon display control section that selects a partial area of the document, the partial area containing at least a portion of one of text and graphics of a page or pages of the document, the icon display control section associating the partial area with a corresponding icon symbolizing the partial area, and displaying the corresponding icon on the screen instead of the at least a portion of one of text and graphics contained within the partial area;

an icon editing section that edits the document by moving, copying or deleting icons, including a section that copies the at least a portion of one of text and graphics within the partial area from a first position of the document to a second position of the document by copying the icon from the first position to the second position, wherein the icon display control section displays the corresponding icon in one of an area icon display mode and a position icon display mode such that in said area icon display mode the information within the partial area on the screen is removed while maintaining the partial area on the screen and an area icon is displayed at any position within the partial area, and such that in the position icon display mode all of the partial area is removed from the screen together with the information contained therein and a position icon is displayed at a position in the document where the partial area was previously present, the area icon display mode being intended to maintain an original layout of the document, and the position icon display mode being intended to change the original layout of the document; and an icon activation control section that restores the information within the partial region on the screen when the icon is activated, wherein the icon activation control section configures the icon as a secret icon and sets a password for the secret icon, the icon activation control section activating the secret icon only when a password specified for the secret icon coincides with the password.

12. The system of claim 11, further comprising:

an icon print control section having a first print mode and a second print mode, wherein upon selection of the first print mode the icon is printed as it appears on the screen, and in a second print mode, the information contained within the partial area is printed instead of the icon.

13. The system of claim 12, further comprising:

an icon editing section that edits the document including moving, copying and deleting the partial area by moving, copying or deleting the icons.

14. The system of claim 13, further comprising:

a relation defining section that stores a relationship among information within a plurality of partial areas and edits the information in one partial area when information defined by the relationship in another partial area is edited.

* * * * *